US011248637B2

(12) United States Patent
Messmore et al.

(10) Patent No.: US 11,248,637 B2
(45) Date of Patent: *Feb. 15, 2022

(54) TECHNOLOGIES FOR INTERLOCKING STRUCTURES

(71) Applicant: Watchfire Signs, LLC, Danville, IL (US)

(72) Inventors: Ryan Messmore, Danville, IL (US); Chad Salmela, Ames, IA (US); Justin M. Bargo, Catlin, IL (US); Robert E. Wright, Oakwood, IL (US); Matthew Curtis Lane, Danville, IL (US)

(73) Assignee: Watchfire Signs, LLC, Danville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/905,782

(22) Filed: Jun. 18, 2020

(65) Prior Publication Data

US 2020/0318666 A1 Oct. 8, 2020

Related U.S. Application Data

(63) Continuation of application No. 15/264,176, filed on Sep. 13, 2016, now Pat. No. 10,690,158.

(51) Int. Cl.
*F16B 5/00* (2006.01)
*F16B 19/02* (2006.01)

(52) U.S. Cl.
CPC ............ *F16B 5/0064* (2013.01); *F16B 19/02* (2013.01)

(58) Field of Classification Search
None
See application file for complete search history.

(56) References Cited

U.S. PATENT DOCUMENTS

| 472,892 A | 4/1892 | Knight |
| 481,117 A | 8/1892 | Naegele |
| 1,066,495 A | 7/1913 | Helvig et al. |
| 1,071,999 A | 9/1913 | Gilson et al. |
| 1,595,402 A | 8/1926 | William et al. |

(Continued)

FOREIGN PATENT DOCUMENTS

| EP | 0175012 | 3/1986 |
| IE | S83321 | 2/2004 |

(Continued)

OTHER PUBLICATIONS

Aerva, AerChannel Quick Setup Guide, Version 1.0, Publication Date Unknown (2 pages).

(Continued)

*Primary Examiner* — David R Dunn
*Assistant Examiner* — Christopher E Veraa
(74) *Attorney, Agent, or Firm* — Dentons US LLP

(57) ABSTRACT

A device includes a first unit and a second unit. The first unit comprises a first C-shaped portion, a first bridge portion, and a first U-shaped portion. The first U-shaped portion comprises a first projection extending therefrom. The second unit comprises a second C-shaped portion, a second bridge portion, and a second U-shaped portion. The second U-shaped portion comprises a second projection extending therefrom. The first projection interlocks with the second projection when the first C-shaped portion and the second C-shaped portion are fastened to a plate.

20 Claims, 20 Drawing Sheets

(56) References Cited

U.S. PATENT DOCUMENTS

| | | | |
|---|---|---|---|
| 1,943,927 A | 1/1934 | Phillips et al. | |
| 2,262,418 A | 11/1941 | Zahodiakin | |
| 2,373,722 A | 4/1945 | Von et al. | |
| 2,529,009 A | 4/1945 | Floss | |
| 2,549,793 A | 4/1951 | Francesco et al. | |
| 3,575,079 A | 4/1971 | Smith et al. | |
| 3,966,163 A | 6/1976 | Getzin | |
| 4,050,724 A | 9/1977 | Nakanishi | |
| 4,136,898 A | 1/1979 | Guenther | |
| 4,319,420 A | 3/1982 | Clinton | |
| 4,465,328 A | 8/1984 | Tihanyi et al. | |
| 5,306,174 A * | 4/1994 | Kiga | H01R 13/639 439/341 |
| 5,523,769 A | 6/1996 | Lauer et al. | |
| 5,619,223 A | 4/1997 | Lee et al. | |
| 5,633,651 A | 5/1997 | Carvajal et al. | |
| 5,767,818 A | 6/1998 | Nishida | |
| 5,813,793 A * | 9/1998 | Baucom | H05K 5/0021 292/127 |
| 5,864,467 A * | 1/1999 | Recchia | H05K 5/0021 361/732 |
| 5,914,698 A | 6/1999 | Nicholson et al. | |
| 5,926,156 A | 7/1999 | Katoh et al. | |
| 5,990,802 A | 11/1999 | Maskeny | |
| 5,991,153 A | 11/1999 | Heady et al. | |
| 6,067,582 A | 5/2000 | Smith et al. | |
| 6,097,351 A | 8/2000 | Nishida | |
| 6,150,996 A | 11/2000 | Nicholson et al. | |
| 6,175,342 B1 | 1/2001 | Nicholson et al. | |
| 6,341,668 B1 | 1/2002 | Fayette et al. | |
| 6,414,650 B1 | 7/2002 | Nicholson et al. | |
| 6,650,539 B1 * | 11/2003 | Lin | H05K 5/0021 211/41.17 |
| 6,697,037 B1 | 2/2004 | Alt et al. | |
| 6,791,513 B2 | 9/2004 | Ogino et al. | |
| 6,816,389 B1 | 11/2004 | Lutz et al. | |
| 6,856,989 B1 | 2/2005 | Zhou et al. | |
| 6,932,392 B1 | 8/2005 | Geislhardt | |
| 7,136,906 B2 | 11/2006 | Giacalone, Jr. | |
| 7,152,040 B1 | 12/2006 | Hawthorne et al. | |
| 7,248,229 B2 | 7/2007 | Zerphy et al. | |
| 7,458,441 B2 | 12/2008 | Hu | |
| 7,716,861 B2 | 5/2010 | Stadjuhar, Jr. | |
| 7,777,811 B2 | 8/2010 | Kondo | |
| 7,823,308 B1 | 11/2010 | Munson et al. | |
| 7,926,213 B1 * | 4/2011 | Kludt | H05K 5/0017 40/605 |
| 7,961,157 B2 | 6/2011 | Perkins et al. | |
| 7,965,257 B2 | 6/2011 | Perkins et al. | |
| 7,986,282 B2 | 7/2011 | Zerphy et al. | |
| 8,046,942 B1 | 11/2011 | Kludt et al. | |
| 8,201,206 B2 | 6/2012 | Sofman et al. | |
| 8,229,458 B2 | 7/2012 | Busch | |
| 8,362,970 B2 | 1/2013 | Perkins et al. | |
| 8,523,247 B2 | 9/2013 | Talpe | |
| 8,544,899 B2 | 10/2013 | Hertrich | |
| 8,615,565 B2 | 12/2013 | Randall | |
| 8,683,340 B2 | 3/2014 | Wilkins | |
| 8,797,235 B2 | 8/2014 | Koebrich et al. | |
| 8,844,180 B2 | 9/2014 | Kludt et al. | |
| 8,864,183 B1 | 10/2014 | Mason et al. | |
| 8,886,759 B2 | 11/2014 | Randall et al. | |
| 8,890,770 B2 | 11/2014 | Koebrich et al. | |
| 9,153,151 B2 | 10/2015 | Messmore et al. | |
| 9,326,398 B2 | 4/2016 | Messmore et al. | |
| 9,955,600 B2 | 4/2018 | Cox | |
| 2001/0030649 A1 | 10/2001 | Mamiya et al. | |
| 2002/0190972 A1 | 12/2002 | Ven de Van | |
| 2003/0007321 A1 * | 1/2003 | Dayley | H05K 5/0021 361/679.6 |
| 2003/0146882 A1 | 8/2003 | Ogino et al. | |
| 2004/0008155 A1 | 1/2004 | Cok | |
| 2004/0054577 A1 | 3/2004 | Inoue et al. | |
| 2004/0090391 A1 | 5/2004 | Kondo | |
| 2004/0165006 A1 | 8/2004 | Kirby et al. | |
| 2004/0259553 A1 | 12/2004 | Delaney et al. | |
| 2005/0134526 A1 | 6/2005 | Willem et al. | |
| 2005/0144066 A1 | 6/2005 | Cope et al. | |
| 2005/0146485 A1 | 7/2005 | Zerphy et al. | |
| 2006/0254103 A1 * | 11/2006 | Strick | G09F 7/00 40/605 |
| 2007/0022005 A1 | 1/2007 | Hanna | |
| 2007/0061204 A1 | 3/2007 | Ellis et al. | |
| 2007/0078706 A1 | 4/2007 | Datta et al. | |
| 2007/0100698 A1 | 5/2007 | Neiman et al. | |
| 2007/0101361 A1 | 5/2007 | Spielman et al. | |
| 2007/0271579 A1 | 11/2007 | Harris et al. | |
| 2007/0294096 A1 | 12/2007 | Randall et al. | |
| 2008/0033795 A1 | 2/2008 | Wishnow et al. | |
| 2008/0220549 A1 | 9/2008 | Nall et al. | |
| 2008/0263467 A1 | 10/2008 | Wilkins | |
| 2008/0285087 A1 | 11/2008 | Perkins et al. | |
| 2009/0106082 A1 | 4/2009 | Sent et al. | |
| 2009/0144157 A1 | 6/2009 | Saracino et al. | |
| 2009/0171790 A1 | 7/2009 | Nagarajayya | |
| 2009/0199230 A1 | 8/2009 | Kumar et al. | |
| 2009/0225506 A1 * | 9/2009 | Lee | H05K 5/0017 361/679.21 |
| 2009/0254824 A1 | 10/2009 | Singh | |
| 2009/0262146 A1 | 10/2009 | Hashimoto | |
| 2009/0289160 A1 | 11/2009 | Kludt et al. | |
| 2010/0020752 A1 | 1/2010 | Anchutz et al. | |
| 2010/0064007 A1 | 3/2010 | Randall | |
| 2010/0118200 A1 | 5/2010 | Gelman et al. | |
| 2010/0164942 A1 | 7/2010 | Ryu | |
| 2010/0169059 A1 | 7/2010 | Thomas-Leopore et al. | |
| 2011/0010732 A1 | 1/2011 | Opdycke | |
| 2011/0072697 A1 | 3/2011 | Miller | |
| 2011/0106626 A1 | 5/2011 | Zender et al. | |
| 2011/0148740 A1 | 6/2011 | Perkins et al. | |
| 2011/0166925 A1 | 7/2011 | Khare et al. | |
| 2011/0241843 A1 | 10/2011 | Marsanne et al. | |
| 2011/0302026 A1 | 12/2011 | Kanakarajan et al. | |
| 2011/0315837 A1 * | 12/2011 | Mitsuhashi | G09F 7/18 248/201 |
| 2012/0127145 A1 | 5/2012 | Jang et al. | |
| 2012/0319926 A1 | 12/2012 | Koebrich et al. | |
| 2013/0183085 A1 | 7/2013 | Zullig et al. | |
| 2013/0215069 A1 | 8/2013 | Lee et al. | |
| 2017/0034930 A1 | 2/2017 | Kludt et al. | |
| 2018/0073533 A1 | 3/2018 | Messmore et al. | |

FOREIGN PATENT DOCUMENTS

| | | |
|---|---|---|
| WO | WO198400926 | 3/1984 |
| WO | WO2004/010682 | 1/2004 |
| WO | WO2006/052837 | 5/2006 |
| WO | WO2009/057149 | 5/2009 |
| WO | WO2012038376 | 3/2012 |

OTHER PUBLICATIONS

Aerva, AerChannel User Guide, Version 3.3, Jan. 16, 2006 (42 pages).

Aerva, AerChannel User Manual, Version 3.7.16, 2006-2007 (32 pages).

Alves et al., Distributed Context-Aware Systems, Technical report RT/22/2011, May 2011 (48 pages).

CISCO, Release Notes for Cisco Digital Media System 4.0, Revised May 17, 2007 (10 pages).

CISCO, Release Notes for Cisco Digital Media System 4.1, Revised Apr. 23, 2008 (20 pages).

CISCO, User Guide for Cisco Digital Media Manager 4.0, Jun. 19, 2007, Cisco Systems, Inc. (102 pages).

CISCO, User Guide for Cisco Digital Media Manager 4.1, Apr. 29, 2008, Cisco Systems, Inc. (128 pages).

CISCO, Using DMM-DSM for digital signage, User Guide for Cisco Digital Media Manager 4.1, Chapter B, Oct. 22, 2007 (31 pages).

English, D., Harris InfoCaster 2.0, Get the Message! StudioDaily, Access Intelligence, LLC, Jun. 1, 2006 (3 pages).

(56) References Cited

OTHER PUBLICATIONS

Europe Supplementary Search Report dated Nov. 16, 2016 for Application No. 14817809.8 filed Jun. 24, 2014 (7 pages).
Gerba, B., Syndicating content to your kiosk or digital sign network, The Digital Signage Insider, Wirespring Technologies, Inc. May 5, 2005 (2 pages).
Harris Broadcast Communications Division, G-Channel/Network Manager, Installation and Setup: G-Channel Network Manager, Leitch Technology International Inc., 2007 (49 pages).
Harris, InfoCaster Category, Where to get rss & xml. Message board post, Imagine Communications Forums, posted Dec. 29, 2004 (3 pages).
Harris, InfoCaster Installation Guide, Harris Canada Systems, Inc., 2004-2007 (82 pages).
Harris, InfoCaster Category, ODBC Configuration Help, Message board post, Imagine Communications Forums, Posted Apr. 8, 2004 (3 pages).
Harris, InfoCaster Digital Signage Solution, 2008 (8 pages).
Harris, InfoCaster User Guide, Harris Canada Systems, Inc., 2004-2007 (228 pages).
Harris, InfoCaster User Guide, Harris Canada Systems, Inc., 2007 (294 pages).
Harris, InfoCaster User Guide, Leitch Tecnhology International, Inc., 2004-2006 (228 pages).
Harris, InfoCaster/Network Manager, Installation and Setup: Infocaster Network Manager, Leitch Technology International Inc., 2004-2007 (53 pages).
Harris, Network Manager 3.0, Release Notes, Leitch Technology International, Inc., 2004-2007 (2 pages).
Harris, Set up External Triggers in InfoCaster, Harris Canada Systems, Inc., 2004-2007 (8 pages).
Harris, Support, InfoCaster Service Program, retrieved using Wayback Machine http://www.infocaster.tv/Support/index.html as archived Jan. 13, 2008 (1 page).
Harris, Text Crawl with an ODBC source, Imagine Communications Forms, posted Dec. 22, 2003 (3 pages).
Haynes, D., Akoo bridges digital and cell phone screens, Sixteen:Nine, Vertical Media Consulting Group Inc., Feb. 25, 2008 (7 pages).
Inscriber, Infocaster network manager, Inscriber Technology Corporation, Publication Date Unknown (2 pages).
Inscriber, Inscriber InfoCaster, Information Channel Creation Tool, Inscriber Technology Corporation, Publication Date Unkown (6 pages).
Inscriber, Inscriber Network Manager, Leitch Technology International, Inc., 2003-2005 (142 pages).
Inscriber, Massanutten Resort, Inscriber InfoCaster Keeps Massanutten Resort Guests Busy, Customer Profile, Publication Date Unknown (2 pages).
Inscriber, RF Serial Port Manager, Use the RF Serial Port Manager, Leitch Technology International Inc., 2004-2005 (3 pages).
International Search Report and Written Opinion dated Apr. 13, 2015 for Application No. PCT/US14/43871 filed Jun. 24, 2014 (7 pages).
M2M, Machine to Machine, Top of Our Radar: Harris Corporation Introduces InfoCaster 3.0 and Network Manager 3.0, Jun. 20, 2007 (5 pages).
Microsoft, How to optimize Microsoft Access when using ODBC data sources, last reviewed Mar. 26, 2007, Revision 7.1, downloaded from internet http:/1support.microsoft.com/ Kb/286222 (2 pages).
M-VENUE, m-VENUE Turns Mobile into Jukebox Remote, Marketing Vox, Jul. 26, 2007 (2 pages).
NGAGE, Case Study: Boston University, Digital Signage Provides Boston University School of Law with a Modern Communication System, Image Centre Group, Publication Date Unknown (5 pages).
Sauer, J., Inscriber InfoCaster 2.0. Powerful digital software handles many tasks, Sound & Video Contractor, NewBay Media, LLC, Apr. 1, 2006 (3 pages).
Schrank, S., Akoo's m-Venue Lets Mobiles Connect to TV Screens, Social Times, Mediabistro Inc., Feb. 25, 2008 (4 pages).
The Web Outside, Event Planner's Guide to Setting Up Wiffiti, May 7, 2009 (6 pages).
The Web Outside, Getting a Custom 'Loca'—With a Side of Paul McCartney, Published Oct. 9, 2009, downloaded from Internet http://theweboutside.com (1 page).
Wiffiti, Learn More About Wiffiti, When you send a text message to Wiffiti, you txt a place instead of a person, retrieved using Wayback Machine http://www.wiffiti.com/learn as archived on Jul. 6, 2007 (2 pages).
Wiffiti, LocaModa Diagram, retrieved using Wayback Machine http://www.locamoda.com/technology/diagram.php?media=diagram-tech.gif as archived on Jul. 6, 2007 (1 page).
Wiffiti, LocaModa Platform, retrieved using Wayback Machine http://www.locamoda.com/technology/index.php as archived Jul. 6, 2007 (2 pages).
Wiffiti, Text to YearlyKos. LocaModa, Inc., retrieved using Wayback Machine http://wiffiti.eom/a/ykos as archived Sep. 23, 2007 (2 pages).
Wiffiti, txt out loud, the blog about Wiffiti: Everything about the Wiffiti network, LocaMida, Inc., retrieved using Wayback Machine http://www.wiffiti.com/txtoutloud/7page_id=5 as archived Jul. 6, 2007 (1 page).
Wiffiti, txt out loud, Wiffitti Sightings, Wiffitti. LocaModa, Inc., retrieved using Wayback Machine http:/www.Wiffiti.com/learn/sightings.php, as archived Jul. 6, 2007 (2 pages).
Wifitti, The LocaModa Solution, retrieved using Wayback Machine http://locamoda.com/technology/solution.phh as archived on Aug. 31, 2007 (2 pages).
Yackey, B., DSE: the year of digital signage, Digital Signage Today, Networld Media Group, Mar. 4, 2008 (12 pages).

* cited by examiner

TECHNOLOGIES FOR INTERLOCKING STRUCTURES

CROSS-REFERENCE TO RELATED PATENT APPLICATIONS

This patent application is a Continuation of U.S. patent application Ser. No. 15/264,176 filed 13 Sep. 2016; which is incorporated herein by reference in its entirety for all purposes.

TECHNICAL FIELD

Generally, this disclosure relates to mechanics. More particularly, this disclosure relates to various technologies for interlocking structures.

BACKGROUND

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure may be concerned with. Further, nothing is disclaimed.

Signage, whether static or dynamic, is used to present content, whether outdoors or indoors. The signage can be mechanic, such as a split-flap display, a flip-disc display, or a roll-sign. Additionally or alternatively, the signage can be electronic, such as an electronic sign or an electronic display. Although the content often presented via the signage is advertising, the signage can be used to present any content for any informational purposes, directional purposes, identification purposes, or safety/regulatory purposes.

Since the signage can have various purposes, the signage should be properly installed and maintained. However, some installation techniques or maintenance techniques are often time consuming or laborious due to signage structure or location, thereby requiring various usages of individual component fitting, fastening schemes, drilling, or others. For example, when a technician needs to selectively fasten/ unfasten various bolts within a signage cabinet, then the technician typically needs to perform various time consuming and laborious operations, such as cabinet alignment and module removal/reinstallation.

Accordingly, at least in a signage industry, there is a need to address at least one of such inefficiencies.

SUMMARY

This disclosure may at least partially address at least one of above inefficiencies. However, this disclosure can prove useful to other technical areas. Therefore, various claims recited below should not be construed as necessarily limited to addressing any of the above inefficiencies.

According to an embodiment of this disclosure, a device comprises: a first unit comprising a first C-shaped portion, a first bridge portion, and a first U-shaped portion, wherein the first C-shaped portion is fastened to a plate, wherein the first bridge portion spans between the first C-shaped portion and the first U-shaped portion, wherein the first U-shaped portion is defined via a first leg portion, a first base portion, and a second leg portion, wherein the first leg portion comprises a first projection distal to the first base portion and extending toward the second leg portion; and a second unit comprising a second C-shaped portion, a second bridge portion, and a second U-shaped portion, wherein the second C-shaped portion is fastened to the plate, wherein the first bridge portion contacts the second bridge portion, wherein the second bridge portion spans between the second C-shaped portion and the second U-shaped portion, wherein the second U-shaped portion is defined via a third leg portion, a second base portion, and a fourth leg portion, wherein the second base portion comprises a second projection extending toward the first base portion such that the first projection contacts the second projection between the first leg portion and the second leg portion.

According to an embodiment of this disclosure, a method comprises: accessing a first unit comprising a first C-shaped portion, a first bridge portion, and a first U-shaped portion, wherein the first bridge portion spans between the first C-shaped portion and the first U-shaped portion, wherein the first U-shaped portion is defined via a first leg portion, a first base portion, and a second leg portion, wherein the first leg portion comprises a first projection distal to the first base portion and extending toward the second leg portion; accessing a second unit comprising a second C-shaped portion, a second bridge portion, and a second U-shaped portion, wherein the first bridge portion contacts the second bridge portion, wherein the second bridge portion spans between the second C-shaped portion and the second U-shaped portion, wherein the second U-shaped portion is defined via a third leg portion, a second base portion, and a fourth leg portion, wherein the second base portion comprises a second projection; moving the first U-shaped portion such that the second projection is positioned between the first leg portion and the second leg portion without contacting the first projection and such that the second projection extends toward the first base portion and such that the second projection is positioned between the first base portion and the second base portion; moving the first projection toward the second projection such that the first projection contacts the second projection between the first leg portion and the second leg portion and such that the second projection is positioned between the first base portion and the second base portion; and fastening the first C-shaped portion and the second C-shaped portion to a plate such that the first projection applies a force onto the second projection, wherein the force is directed toward the first C-shaped portion.

According to an embodiment of this disclosure, a system comprises: a first signage device comprising a first unit comprising a first C-shaped portion, a first bridge portion, and a first U-shaped portion, wherein the first C-shaped portion is fastened to a plate, wherein the first bridge portion spans between the first C-shaped portion and the first U-shaped portion, wherein the first U-shaped portion is defined via a first leg portion, a first base portion, and a second leg portion, wherein the first leg portion comprises a first projection distal to the first base portion and extending toward the second leg portion, wherein the first unit supports a first signage device; and a second signage device comprising a second unit comprising a second C-shaped portion, a second bridge portion, and a second U-shaped portion, wherein the second C-shaped portion is fastened to the plate, wherein the first bridge portion contacts the second bridge portion, wherein the second bridge portion spans between the second C-shaped portion and the second U-shaped portion, wherein the second U-shaped portion is defined via a third leg portion, a second base portion, and a fourth leg portion, wherein the second base portion comprises a second projection extending toward the first base portion such that the first projection contacts the second projection between the first leg portion and the second leg portion, wherein the second unit is supported via a second signage device, wherein the second unit supports the first unit.

This disclosure may be embodied in various forms illustrated in a set of accompanying illustrative drawings. Note that variations are contemplated as being a part of this disclosure, limited only by a scope of various claims recited below.

BRIEF DESCRIPTION OF DRAWINGS

The set of accompanying illustrative drawings shows various example embodiments of this disclosure. Such drawings are not to be construed as necessarily limiting this disclosure. Like numbers and/or similar numbering scheme can refer to like and/or similar elements throughout.

DETAILED DESCRIPTION OF PREFERRED EMBODIMENTS

Figure 1:
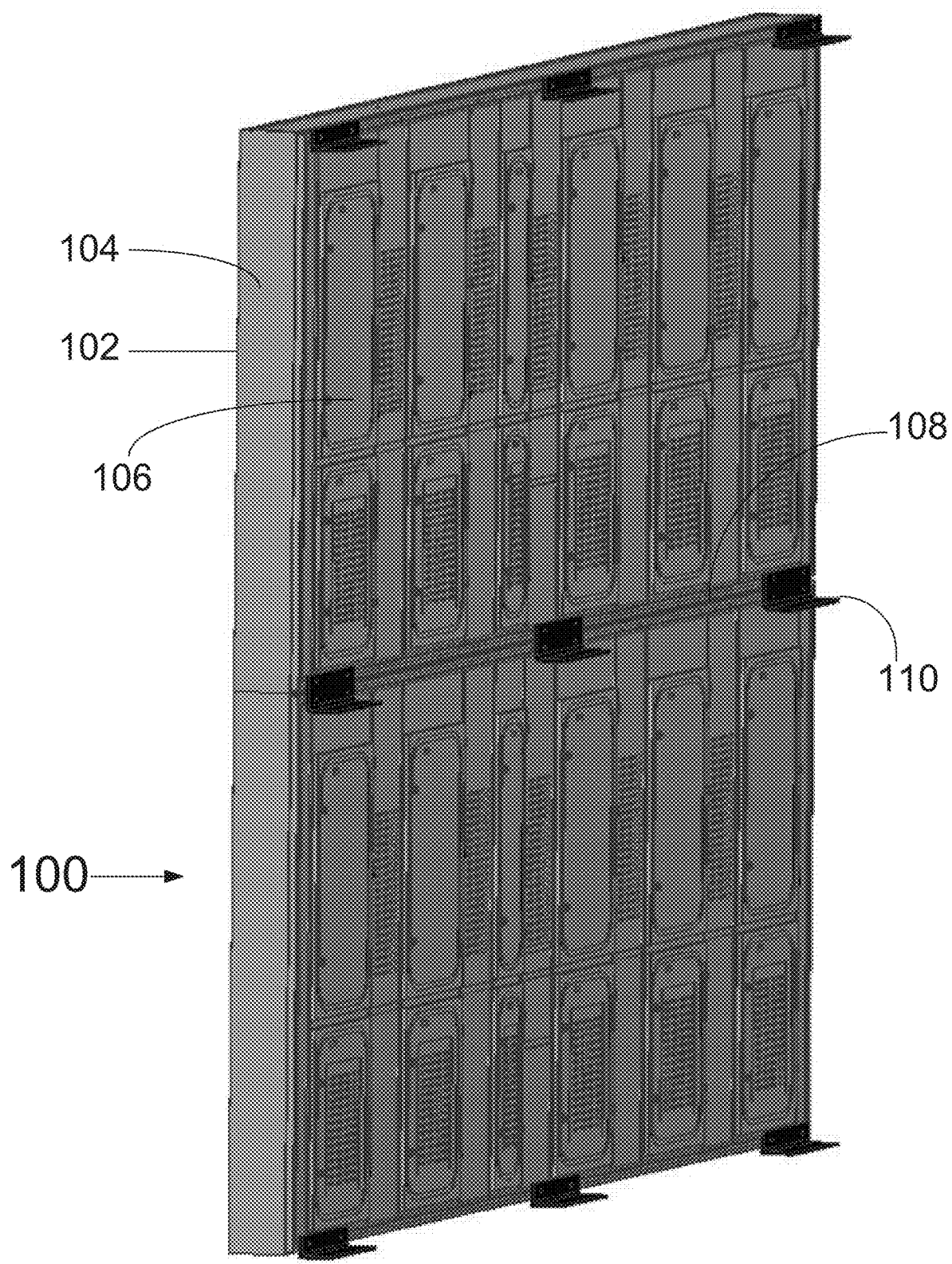
FIG. 1 shows a perspective view of an embodiment comprising a stacking arrangement involving a plurality of signage units joined via a plurality of L-shaped brackets according to this disclosure.

This disclosure is now described more fully with reference to the set of accompanying illustrative drawings, in which example embodiments of this disclosure are shown. This disclosure may, however, be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

Features described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing particular example embodiments and is not intended to be necessarily limiting of this disclosure. As used herein, various singular forms "a," "an" and "the" are intended to include various plural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Example embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various example embodiments of this disclosure should not be construed as necessarily limited to various particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional (3O) printing, laser cutting, computer numerical control routing, milling, pressing, stamping, vacuum forming, hydroforming, injection molding, lithography, and so forth.

Any and/or all elements, as disclosed herein, can be and/or include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can be and/or include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, opaqueness, luminescence, reflection, phosphorescence, anti-reflection and/or holography, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" and/or "substantially" refers to a +/−10% variation from a nominal value/term. Such variation is always included in any given value/term provided herein, whether or not such variation is specifically referred thereto.

If any disclosures are incorporated herein by reference and such disclosures conflict in part and/or in whole with this disclosure, then to an extent of a conflict, if any, and/or a broader disclosure, and/or broader definition of terms, this disclosure controls. If such disclosures conflict in part and/or in whole with one another, then to an extent of a conflict, if any, a later-dated disclosure controls.

FIG. 1 shows a perspective view of an embodiment comprising a stacking arrangement involving a plurality of signage units joined via a plurality of L-shaped brackets according to this disclosure. A stacking arrangement 100 comprises a plurality of signage units 102, whether configured for an outdoors or an indoors use, in whole or in part. The signage units 102 can be mechanic or electronic, in any permutation/combinatory manner, in whole or in part. For example, at least one of the signage units 102 can comprise at least one of a split-flap display, a flip-disc display, or a roll-sign. Additionally or alternatively, at least one of the signage units 102 can comprise at least one of an electronic sign or an electronic display, in whole or in part. The signage units 102 can output, whether statically or dynamically, such as via a visual presentation, any content for any informational purposes, directional purposes, identification purposes, identification purposes, or safety/regulatory purposes, in whole or in part. For example, at least one of the signage units 102 can display an advertising content outdoors. Also, note that although the stacking arrangement 100 depicts stacking of the signage units 102 along a vertical plane, in other embodiments, the signage units 102 can be positioned along a horizontal plane adjacent to each other. Yet in other embodiments, the signage units 102 can be positioned along a diagonal plane adjacent to each other.

Each of the signage units 102 includes a cabinet 104 and a door 106. In some embodiments, at least one of the signage units 102 lacks the door 106. The cabinet 104 can comprise at least one of a plastic, a metal, a wood, a rubber, or any other material. The cabinet 104 can be unitary, such as a single continuous unit, or an assembly of pieces, such as via any coupling method, including at least one of fastening, adhering, interlocking, mating, or any others. The cabinet 104 contains an interior space, which may host a cable, a cable harness, a controller, a power supply, or other signage accessories. The door 106 controls access to the interior space. The door 106 can comprise at least one of a plastic, a metal, a wood, a rubber, or any other material. The door 106 can be unitary, such as a single continuous unit, or an assembly of pieces, such as via any coupling method, including at least one of fastening, adhering, interlocking, mating, or any others. The cabinet 104 and the door 106 can be coupled via any coupling method, including at least one of fastening, adhering, interlocking, mating, or any others.

The cabinet 104 includes a longitudinal portion 108 to which an L-shaped bracket 110 is fastened. For example, the L-shaped bracket 110 can be used to support or suspend a device, which may have a weight between 0 kilograms and 1,000 kilograms, such as 400 kilograms or 700 kilograms. Also, for example, the L-shaped bracket 110 can be used to couple to a device, such as via fastening, interlocking, mating, adhering, or others. The L-shaped bracket 110 can comprise at least one of a plastic, a metal, a wood, a rubber, or any other material. The L-shaped bracket 110 can be unitary, such as a single continuous unit, or an assembly of pieces, such as via any coupling method, including at least one of fastening, adhering, interlocking, mating, or any others.

Figure 2:
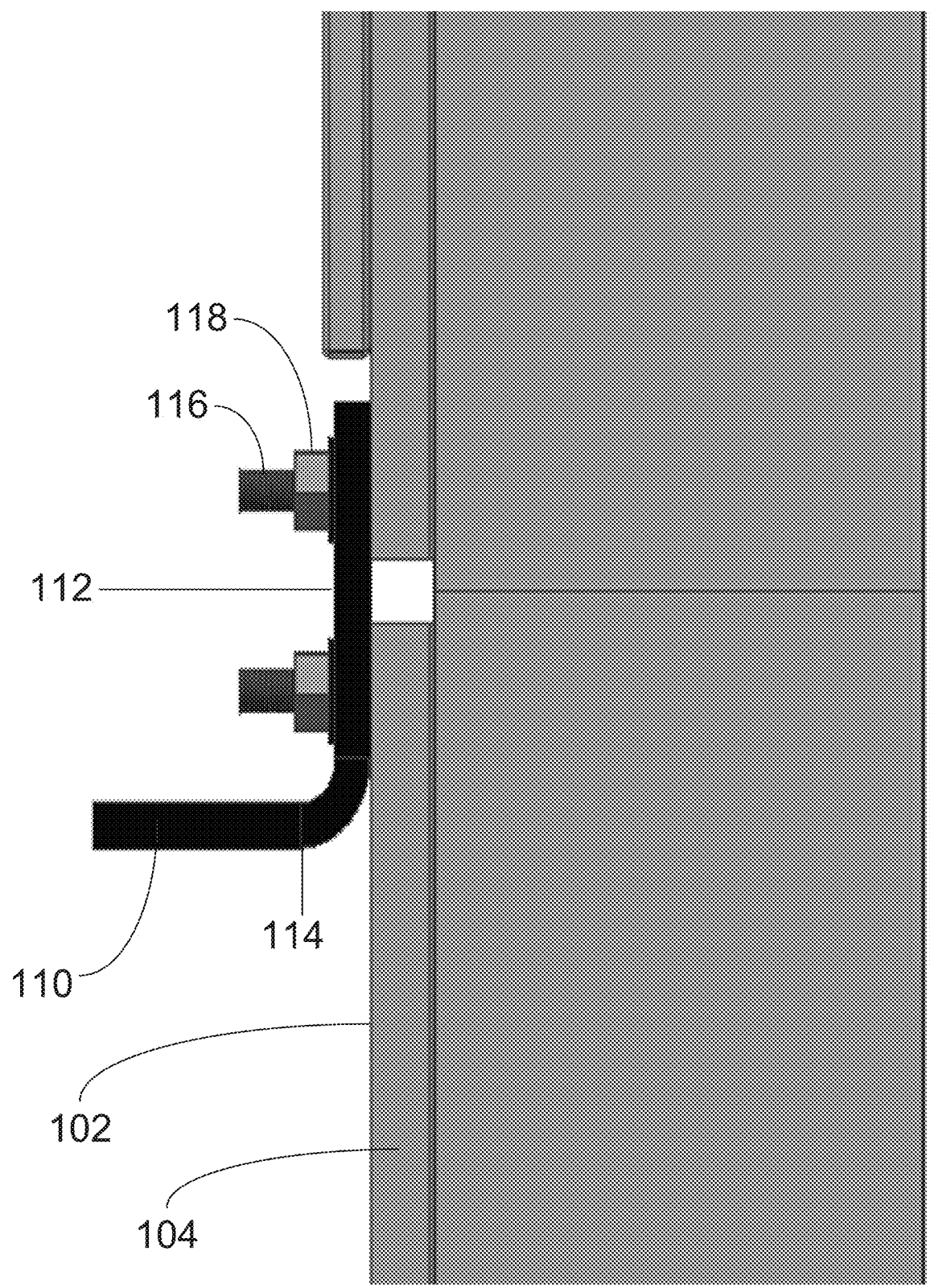
FIG. 2 shows a side view of an embodiment comprising a pair of stacked signage units joined via an L-shaped bracket according to this disclosure.

FIG. 2 shows a side view of an embodiment comprising a pair of stacked signage units joined via an L-shaped bracket according to this disclosure. The cabinets 104 are stacked and are secured via the L-shaped bracket 110, which is defined via a first plate 112 and a second plate 114. The first plate 112 is perpendicularly coupled to the second plate 114. For example, the L-shaped bracket 110 can comprise a single piece of steel that is bent into an L-shape. However, note that non-perpendicular orientation is possible, whether acute or obtuse. Also, note that the L-shaped bracket 110 can be a plurality of plates coupled together, such as the first plate 112 and the second plate 114.

The L-shaped bracket 110 is fastened to the cabinets 104 via a plurality of bolts 116 and a plurality of nuts 118. The bolts 116 extend through the first plate 112 into the cabinet 104. The nuts 118 are fastened onto the bolts 116, such as via threading. At least one of the bolts 116 can comprise at least one of a plastic, a metal, a wood, a rubber, or any other material. At least one of the bolts 116 can be unitary, such as a single continuous unit, or an assembly of pieces, such as via any coupling method, including at least one of fastening, adhering, interlocking, mating, or any others. At least one of the nuts 118 can comprise at least one of a plastic, a metal, a wood, a rubber, or any other material. At least one of the nuts 118 can be unitary, such as a single continuous unit, or an assembly of pieces, such as via any coupling method, including at least one of fastening, adhering, interlocking, mating, or any others.

Figure 3:
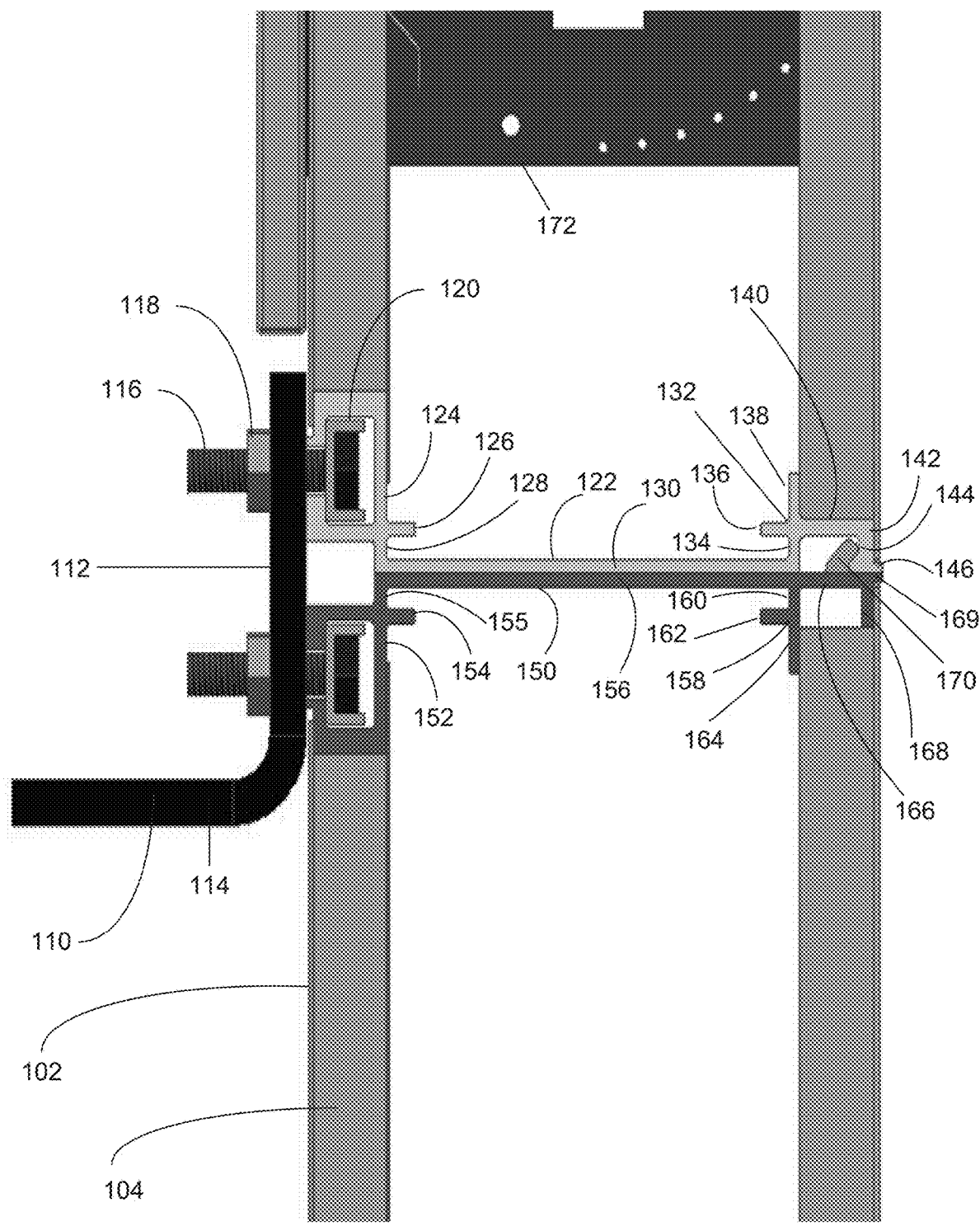
FIG. 3 shows a cross-sectional view of an embodiment comprising a pair of stacked signage units joined via an L-shaped bracket and fastenably interlocked via a pair of protrusions according to this disclosure.

FIG. 3 shows a cross-sectional view of an embodiment comprising a pair of stacked signage units joined via an L-shaped bracket and fastenably interlocked via a pair of protrusions according to this disclosure. The cabinets 104 are stacked in a secure manner via a first unit 122 and a second unit 150 engaging each other, while the bolts 116 exert a force via the L-shaped bracket 110 in a direction away from cabinets 104 along a horizontal plane. As shown, the cabinets 104 contain an upper cabinet 104 and a lower cabinet 104. Resultantly, the first unit 122 supports the upper cabinet 104 and the second unit 150 is positioned on the lower cabinet 104, while the first unit 122 is supported via the second unit 150. Note that at least the upper cabinet 104 hosts a divider panel 172 for various signage operational purposes, such as for attaching a power supply or routing a wire or a cable.

The first unit 122 can be unitary, such as a single continuous unit, or an assembly of pieces, such as via any coupling method, including at least one of fastening, adhering, interlocking, mating, or any others. In some embodiments, the first unit 122 is unitary with the upper cabinet 104, such as the upper cabinet 104 comprising a bottom side structured according to the first unit 122, such as via extrusion. The first unit 122 can comprise at least one of a plastic, a metal, a wood, a rubber, or any other material. For example, the first unit 122 can comprise stainless steel. The first unit 122 can be solid or perforated, in whole or in part, such as any portion thereof. The first unit 122 comprises a first C-shaped portion 124, a first bridge portion 130, and a first U-shaped portion 132. The first bridge portion 130 spans between the first C-shaped portion 124 and the first U-shaped portion 132. Although the first bridge portion 130 is rectilinear, in other embodiments, the first bridge portion 130 is non-rectilinear, such as arcuate, whether concave or convex, sinusoidal, zigzag, or any other extension, along any dimension, such as a length, a width, or a height.

The second unit 150 can be unitary, such as a single continuous unit, or an assembly of pieces, such as via any coupling method, including at least one of fastening, adhering, interlocking, mating, or any others. In some embodiments, the second unit 150 is unitary with the lower cabinet 104, such as the lower cabinet 104 comprising an upper side structured according to the second unit 150, such as via extrusion. The second unit 150 can comprise at least one of a plastic, a metal, a wood, a rubber, or any other material. For example, the second unit 150 can comprise stainless steel. Note that the first unit 122 and the second unit 150 can be identical to or different from each other in structure, shape, size, material, or any other measureable property. The second unit 150 can be solid or perforated, in whole or in part, such as any portion thereof. The second unit 150 comprises a second C-shaped portion 152, a second bridge portion 156, and a second U-shaped portion 158. The first C-shaped portion 124 opposes the second C-shaped portion 152 along a vertical plane. The second bridge portion 156 spans between the second C-shaped portion 152 and the second U-shaped portion 158. Although the second bridge portion 156 is rectilinear, in other embodiments, the second bridge portion 156 is non-rectilinear, such as arcuate, whether concave or convex, sinusoidal, zigzag, or any other extension, along any dimension, such as length, width, or height. The first bridge portion 130 is immediately adjacent to or contacts the second bridge portion 156.

Each of the first C-shaped portion 124 and the second C-shaped portion 152 hosts a bolt carrier 120 through which the bolts 116 extend before engaging the L-shaped bracket 110. For example, at least one of the bolts 116 comprises a head and a stem, where the stem extends from the head through the bolt carrier 120 and the L-shaped bracket, while the head engages the bolt carrier 120. Resultantly, shaped portion 124 and the second C-shaped portion 152 are fastened to the L-shape bracket 110, such as via the first plate 112. The bolt carrier 120 can be unitary, such as a single continuous unit, or an assembly of pieces, such as via any coupling method, including at least one of fastening, adhering, interlocking, mating, or any others. The bolt carrier 120 can comprise at least one of a plastic, a metal, a wood, a rubber, or any other material. Note that the bolt carrier 120 can slide into a respective C-shaped portion 124, 152 together with a respective bolt 116. In some embodiments, at least one bolt carrier 120 is absent.

The first unit 122 and the second unit 150 contain a first protrusion 126 and a second protrusion 154, respectively. At least one of the first protrusion 126 or the second protrusion 154 can be used as a rail, such as for sliding a device thereon, in whole or in part. Alternatively or additionally, at least one of the first protrusion 126 or the second protrusion 154 can be used to engage, support, limit vertical travel, or suspend a device, which may have a weight between 0 kilograms and 1,000 kilograms, such as 400 kilograms or 700 kilograms. In some embodiments, at least one of the first protrusion 126 or the second protrusion 154 is absent.

Each of the first unit 122 and the second unit 150 contains a first wall portion 128 and a second wall portion 155, respectively. The first wall portion 128 and the second wall portion 155 are used to stand-off the first C-shaped portion 124 and the second C-shaped portion 152 from the first bridge portion 130 and the second bridge portion 156, respectively. In some embodiments, at least one of first wall portion 128 or a second wall portion 155 is absent. For example, at least one of the first C-shaped portion 124 or the second C-shaped portion 152 directly contacts at least one of the first bridge portion 130 or the second bridge portion 156, respectively.

The first U-shaped portion 132 is defined via a first leg portion 134, a first base portion 140, and a second leg portion 142. The second leg portion 142 comprises a first projection 144 distal to the first base portion 140 and extending toward the first leg portion 134. Although the first projection 144 has a trapezoid/triangular side profile, in other embodiments, the first projection 144 has a different side profile, such as rectangular, cuboid, oval, circular, trapezoid, triangle, pentagon, hexagon, octagon, concave, convex, or any other polygon or shape with at least one side, whether open or closed-shape, including an alphanumeric shape of at least a Latin alphabet, such as L-shaped. The second leg portion 142 also includes a tail portion 146 extending therefrom. The tail portion 146 provides support to the upper cabinet 102. Although the tail portion 146 is distal to the first base portion 140, in some embodiments, the tail portion 146 is medial or proximal to the first base portion 140.

The first unit 122 contains a third protrusion 136 extending from the first U-shaped portion 132. The third protrusion 136 can be used as a rail, such as for sliding a device thereon, in whole or in part. Alternatively or additionally, the third protrusion 136 can be used to engage, support, limit vertical travel, or suspend a device, which may have a weight between 0 kilograms and 1,000 kilograms, such as 400 kilograms or 700 kilograms. For example, the first protrusion 126 and the third protrusion 136 can operate in concert to engage, support, or suspend the device. In some embodiments, the third protrusion 136 is absent.

The first unit 122 contains a fourth protrusion 138 extending from the first U-shaped portion 132. The fourth protrusion 138 can operate as a ledge or a wall internally supporting the upper cabinet 104. In some embodiments, the fourth protrusion 138 can engage with the upper cabinet 104, such as via coupling therewith, for instance via fastening, adhering, mating, interlocking, magnetizing, or other coupling techniques.

The second U-shaped portion 158 is defined via a third leg portion 160, a second base portion 166, and a fourth leg portion 168. The second base portion 166 comprises a second projection 170, such as a tab, extending toward the first base portion 140 such that the first projection 144 contacts the second projection 170 between the first leg portion 134 and the second leg portion 142 and such that the second projection 170 is between the first base portion 140 and the second base portion 166. For example, the first projection 144 functions as a female portion and the second projection 170 functions as a male portion, wherein the first projection 144 engages and thereby complimentarily mates with the second projection 170, such as for secure interlocking. Although the second projection 170 has a non-rectilinear, curved side profile, in other embodiments, the first projection 144 has a different side profile, such as rectilinear, rectangular, cuboid, oval, circular, trapezoid, triangle, pentagon, hexagon, octagon, concave, convex, or any other polygon or shape with at least one side, whether open or closed-shape, including an alphanumeric shape of at least a Latin alphabet, such as L-shaped. The fourth leg portion 168 includes a tail portion 169 extending therefrom. The tail portion 169 provides contacts the tail portion 146 and engages to the lower cabinet 102. Although the tail portion 169 is distal to the second base portion 166, in some embodiments, the tail portion 169 is medial or proximal to the second base portion 166. Note that first leg portion 134 is aligned with the third leg portion 160 along a vertical plane, while the second leg portion 142 is aligned with the fourth leg portion 168 along the vertical plane. However, note that in other embodiments, at least one of such alignments may be absent.

The second unit 150 contains a fifth protrusion 162 extending from the second U-shaped portion 158. The fifth protrusion 162 can be used as a rail, such as for sliding a device thereon, in whole or in part. Alternatively or additionally, the fifth protrusion 162 can be used to engage, support, limit vertical travel, or suspend a device, which may have a weight between 0 kilograms and 1,000 kilograms, such as 400 kilograms or 700 kilograms. For example, the second protrusion 154 and the fifth protrusion 162 can operate in concert to engage, support, or suspend the device. In some embodiments, the fifth protrusion 162 is absent.

The second unit 150 contains a sixth protrusion 164 extending from the second U-shaped portion 158. The sixth protrusion 164 can operate as a ledge or a wall internally supporting the lower cabinet 104. In some embodiments, the sixth protrusion 138 can engage with the lower cabinet 104, such as via coupling therewith, for instance via fastening, adhering, mating, interlocking, magnetizing, or other coupling techniques.

Figure 4:
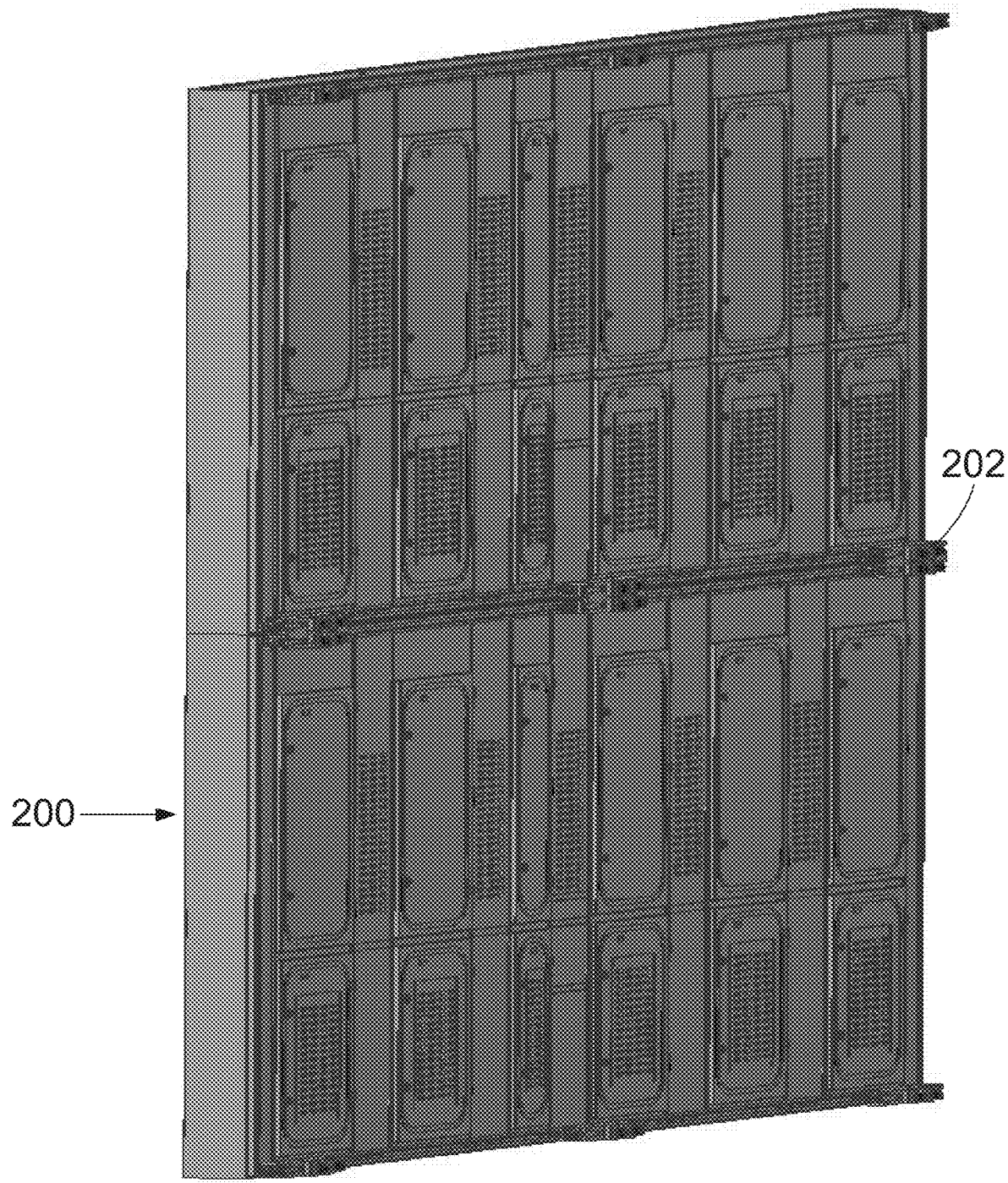
FIG. 4 shows a perspective view of an embodiment comprising a stacking arrangement involving a plurality of signage units joined via a plurality of strut brackets according to this disclosure.
Figure 5:
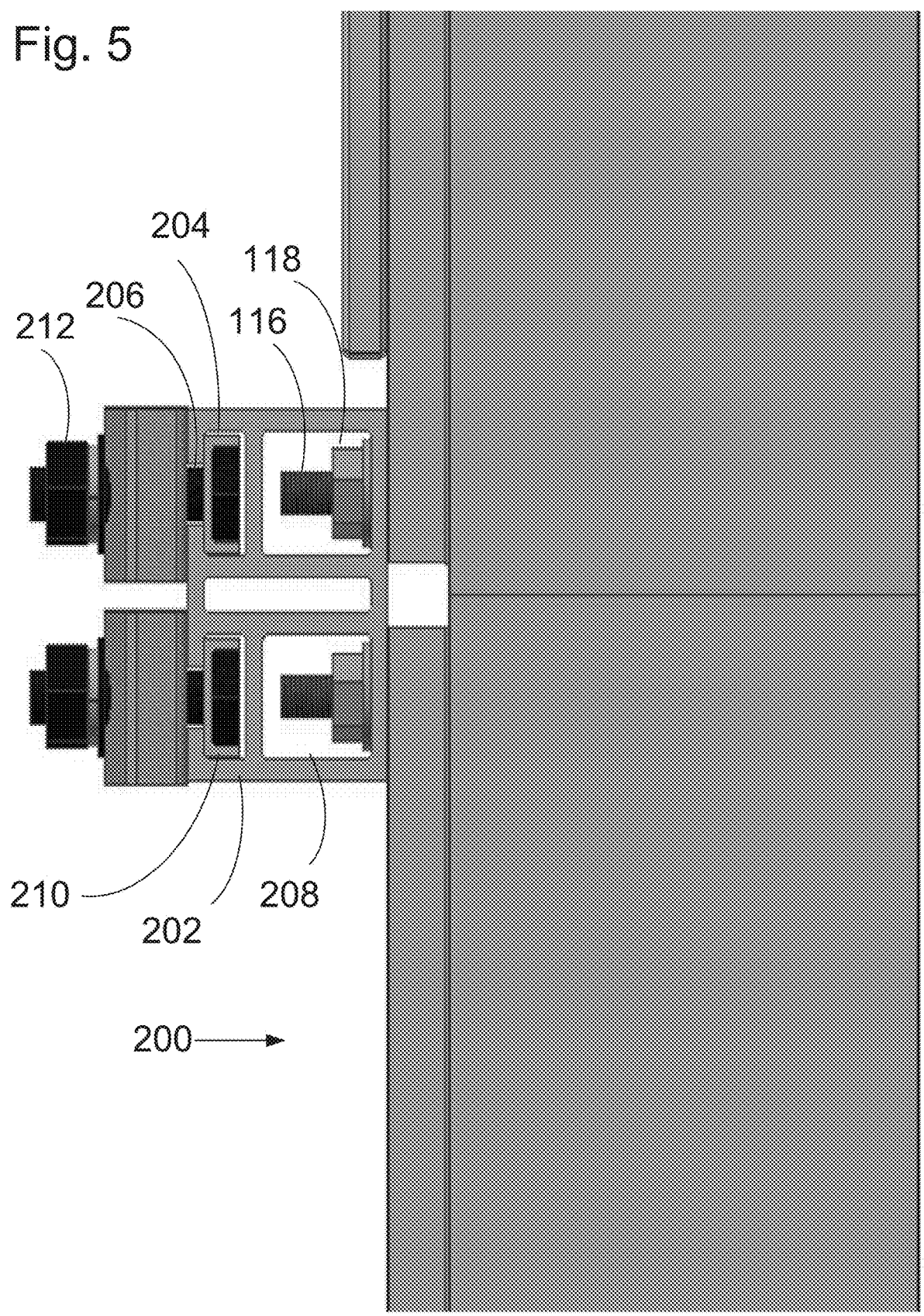
FIG. 5 shows a side view of an embodiment comprising a pair of stacked signage units joined via a strut bracket according to this disclosure.
Figure 6:
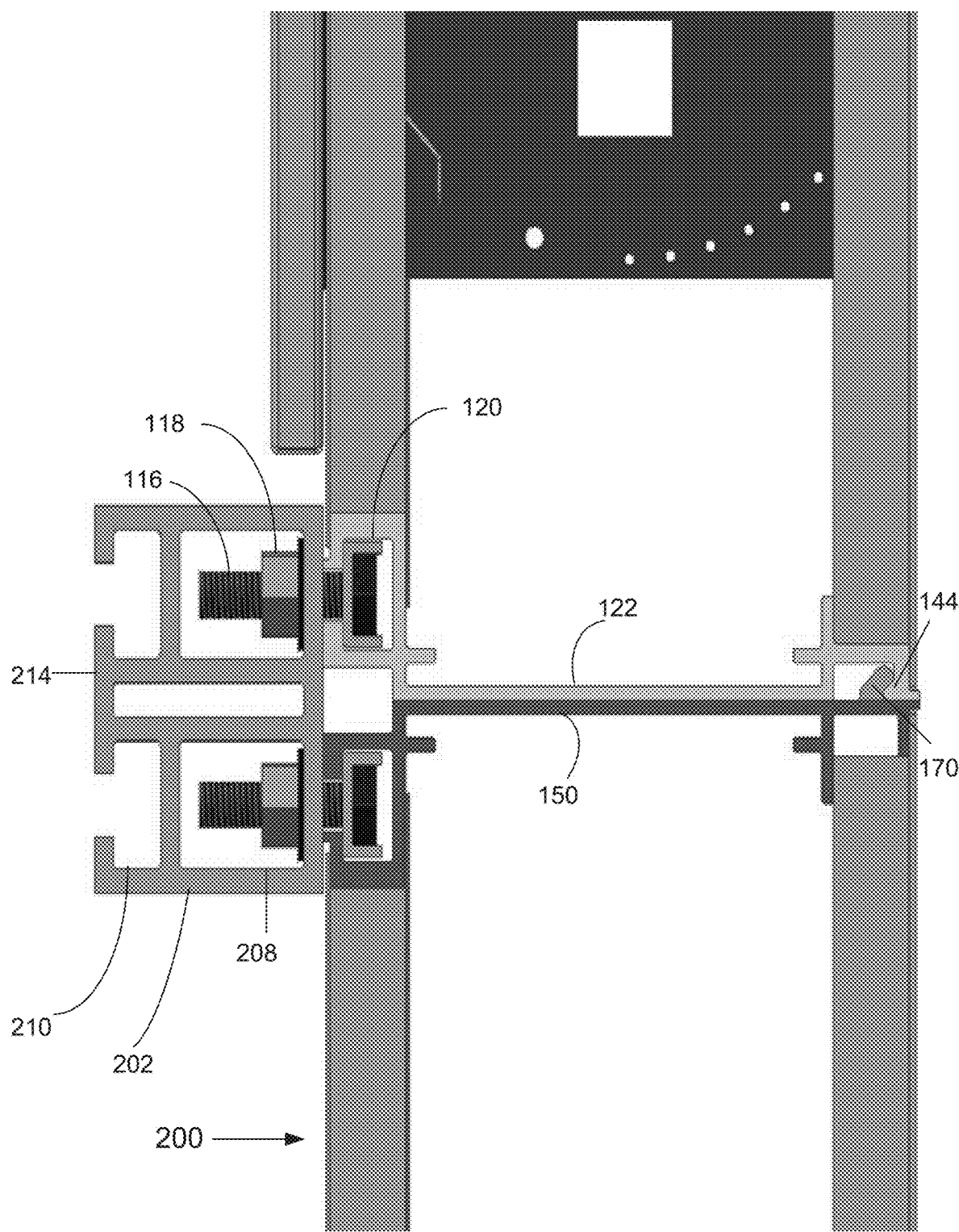
FIG. 6 shows a cross-sectional view of an embodiment comprising a pair of stacked signage units joined via a strut bracket and fastenably interlocked via a pair of protrusions according to this disclosure.

FIG. 4 shows a perspective view of an embodiment comprising a stacking arrangement involving a plurality of signage units joined via a plurality of strut brackets according to this disclosure. FIG. 5 shows a side view of an embodiment comprising a pair of stacked signage units joined via a strut bracket according to this disclosure. FIG. 6 shows a cross-sectional view of an embodiment comprising a pair of stacked signage units joined via a strut bracket and fastenably interlocked via a pair of protrusions according to this disclosure. Unlike the stacking arrangement 100, a stacking arrangement 200 contains the cabinet 104, which includes the longitudinal portion 108 to which a strut bracket 202, such as a beam clamp, is fastened. For example, the strut bracket 202 can be used to support or suspend a device, which may have a weight between 0 kilograms and 1,000 kilograms, such as 400 kilograms or 700 kilograms. Also, for example, the strut bracket 202 can be used to couple to a device, such as via fastening, interlocking, mating, adhering, or others. The strut bracket 202 can comprise at least one of a plastic, a metal, a wood, a rubber, or any other material. The strut bracket 202 can be unitary, such as a single continuous unit, or an assembly of pieces, such as via any coupling method, including at least one of fastening, adhering, interlocking, mating, or any others.

The strut bracket 202 is defined via a first portion 208, a second portion 210, and a third portion 214. The first portion 208 is 0-shaped, but other shapes are possible. The second portion 210 is C-shaped, but other shapes are possible. The strut bracket 202 is fastened to the cabinets 104 via the bolts 116 and the nuts 118. The bolts 116 extend through the first portion 208 into the cabinet 104. The nuts 118 are fastened onto the bolts 116, such as via threading. The strut bracket 202 can host a plurality of bolt carriers 204, as described above, a plurality of bolts 206, as described above, and a plurality of nuts 212, as described above, where the nuts 212 are fastened onto the bolts 206. Note that the third portion 214 facilitates hosting of the bolts 206, such as via enabling a proper bolt alignment.

Figure 7:
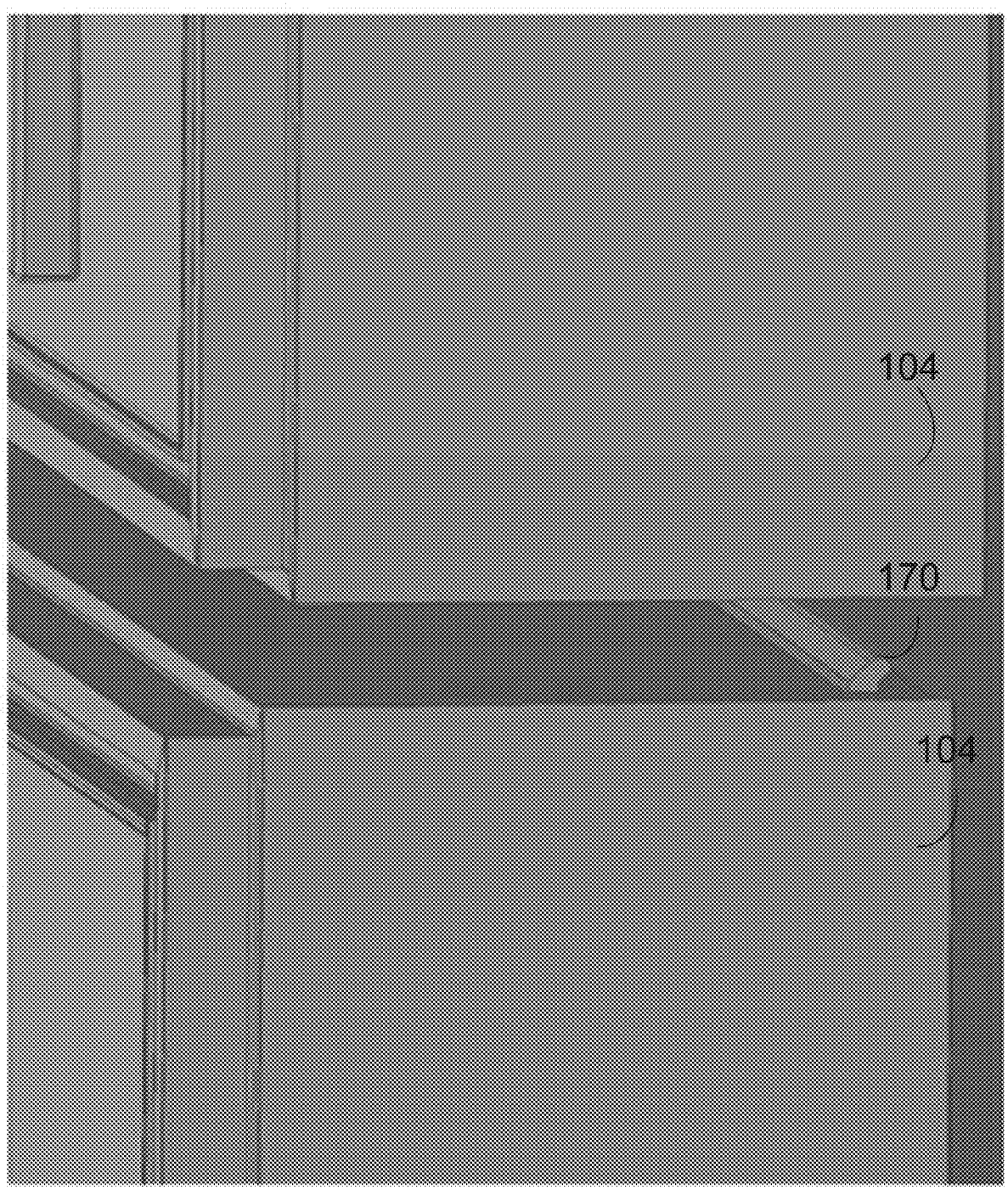
FIG. 7 shows a perspective view of an embodiment comprising a pair of signage units before stacking, where one of the signage units comprises an elongated male protrusion for interlocking according to this disclosure.
Figure 8:
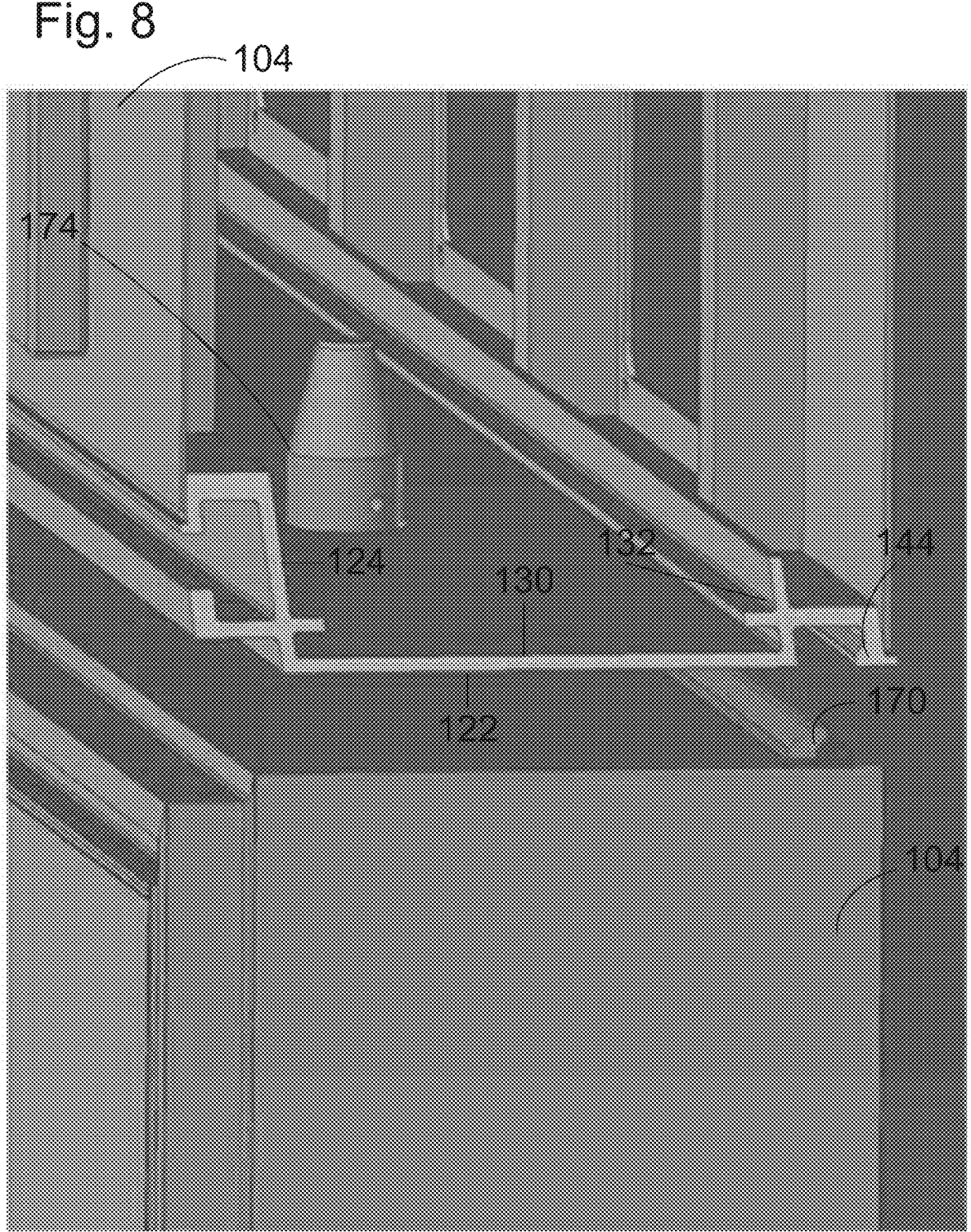
FIG. 8 shows a cross-sectional view of an embodiment comprising a pair of signage units before stacking, where the signage units are aligned via an alignment pin according to this disclosure.

FIG. 7 shows a perspective view of an embodiment comprising a pair of signage units before stacking, where one of the signage units comprises an elongated male protrusion for interlocking according to this disclosure. FIG. 8 shows a cross-sectional view of an embodiment comprising a pair of signage units before stacking, where the signage units are aligned via an alignment pin according to this disclosure. Note that the cabinets 104 are not stacked and the second projection 170 is visible, i.e., a male portion. Additionally, note that the first protrusion 144, i.e., a female portion, longitudinally extends parallel to the second protrusion 170. Further, note that the second projection 170 longitudinally extends parallel to the longitudinal portion 108, yet on opposing side of the cabinet 104. However, note that in other embodiments, the second projection 170 longitudinally extends non-parallel to the longitudinal portion 108, such as in an arcuate manner.

The first bridge portion 130 defines an opening therein. The opening is oval, but can be circular, elliptical, rectangular, triangular, cuboid, pentagonal, hexagonal, octagonal, cam (a pear, a heart, or a drop), or any other shape.

An alignment pin 174 extends through the opening of the first bridge portion 130. The alignment pin 174 comprises an upper part, a middle part, and a lower part, with the middle part being medical to the upper part and the lower part. The upper part is tapered, such as for ease of insertion into the opening of the first bridge portion 130, for instance via a crane. The upper part can be conical. The middle part is cylindrical. The middle part comprises a sidewall, which defines a screwdriver opening for internal access into the middle part. Note that the opening of the first bridge portion 130 sizably accommodates for the middle part. The lower part is also cylindrical, yet diametrically smaller than the middle part. However, diametrical deviations are possible, whether equivalent or larger. The alignment pin 174 can be removable or threaded.

Figure 9:
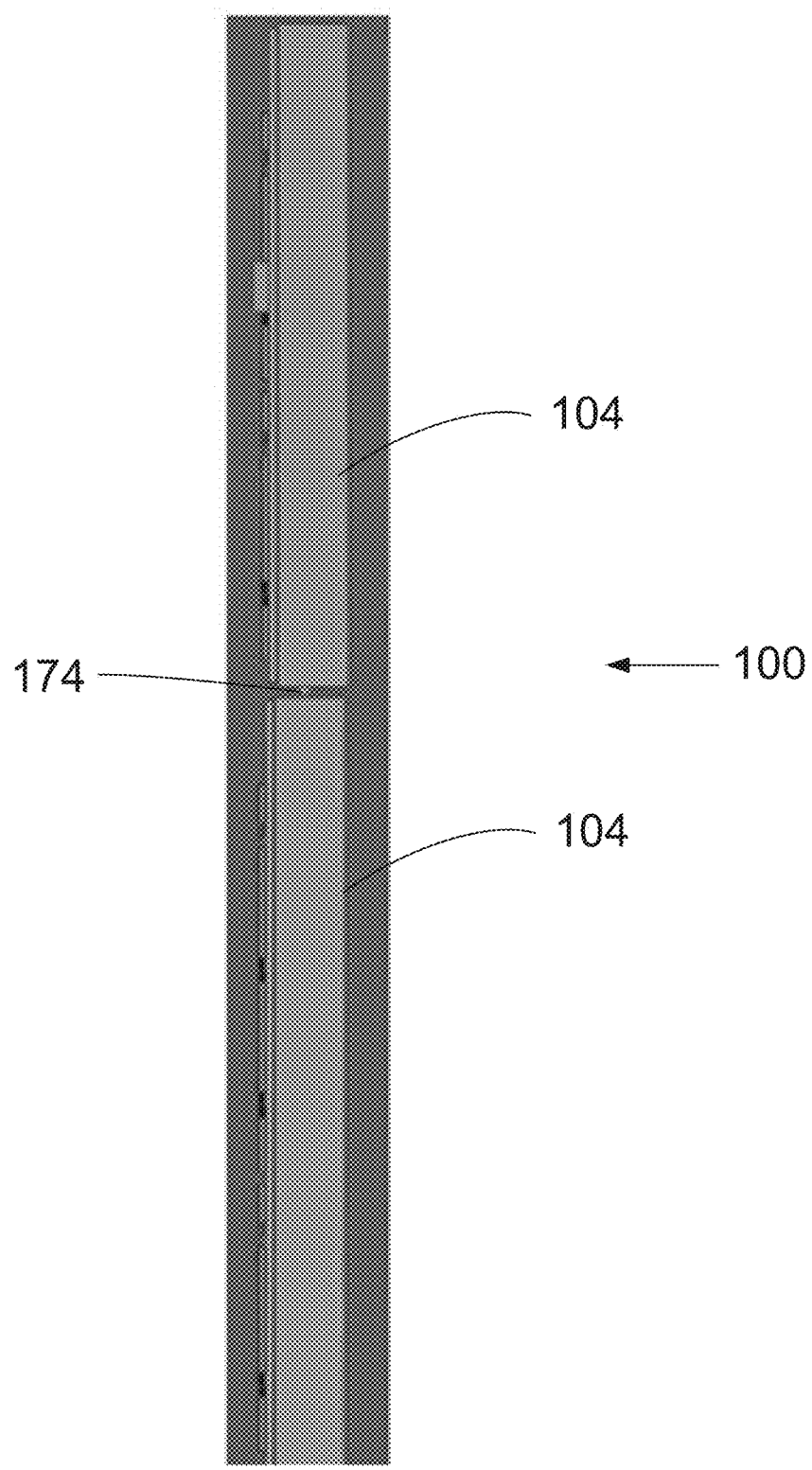
FIG. 9 shows a side view of an embodiment comprising a pair of signage units before stacking, where the signage units are aligned via an alignment pin according to this disclosure.
Figure 10:
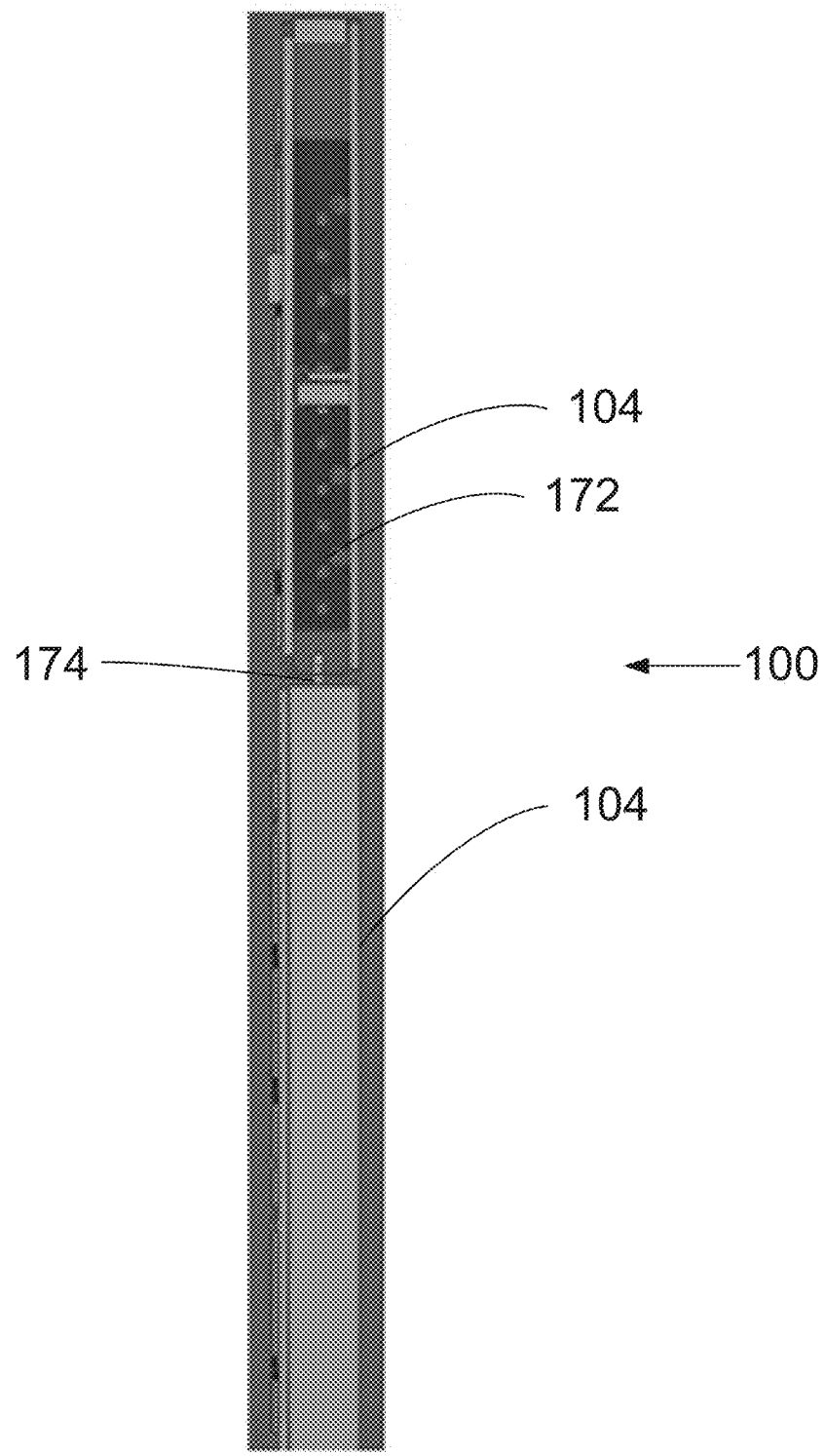
FIG. 10 shows a partial cross-sectional view and a partial side view of an embodiment comprising a pair of signage units before stacking, where the signage units are aligned via an alignment pin according to this disclosure.
Figure 11:
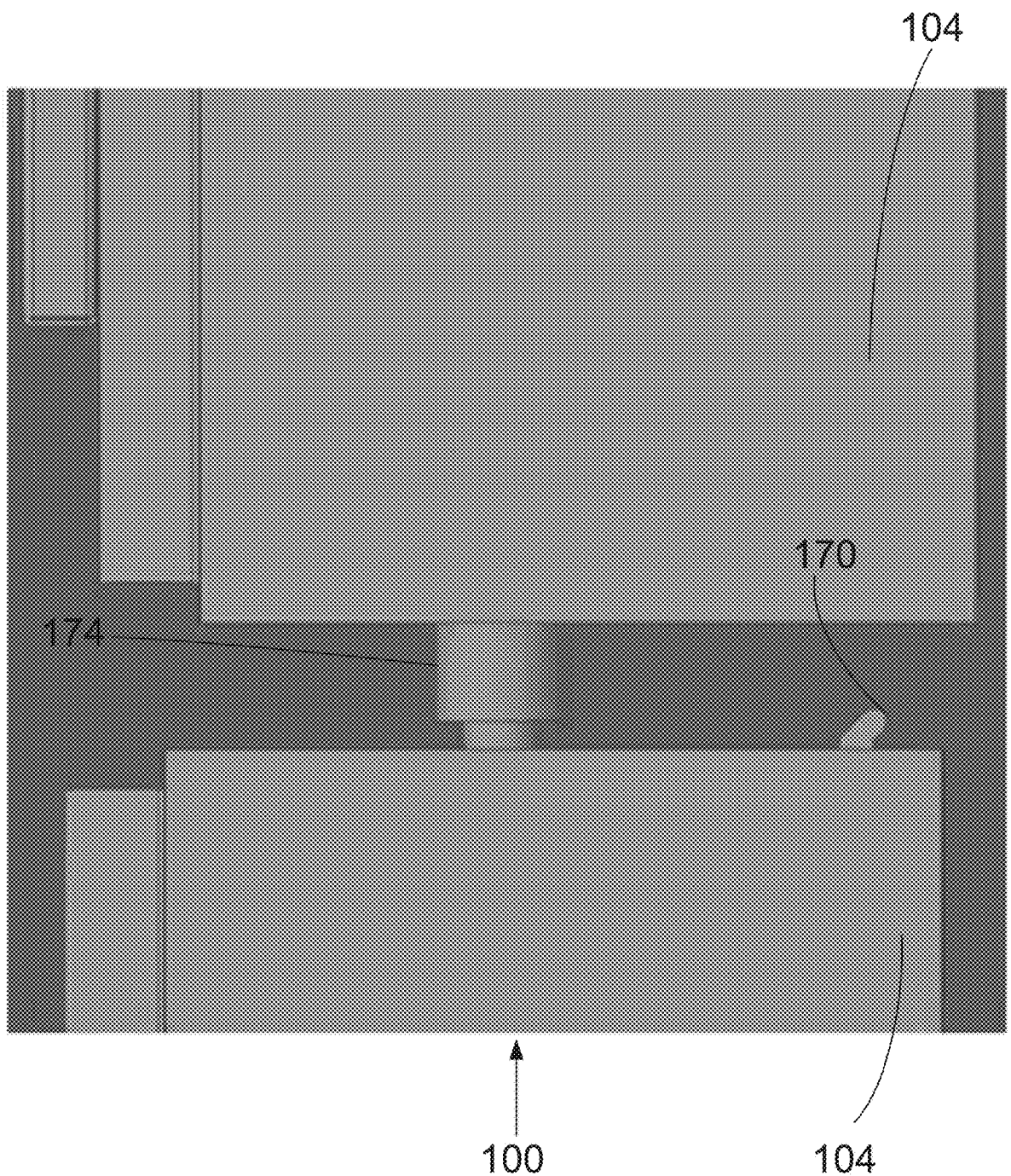
FIG. 11 shows a side view of an embodiment comprising a pair of signage units before stacking, where the signage units are aligned via an alignment pin according to this disclosure.
Figure 12:
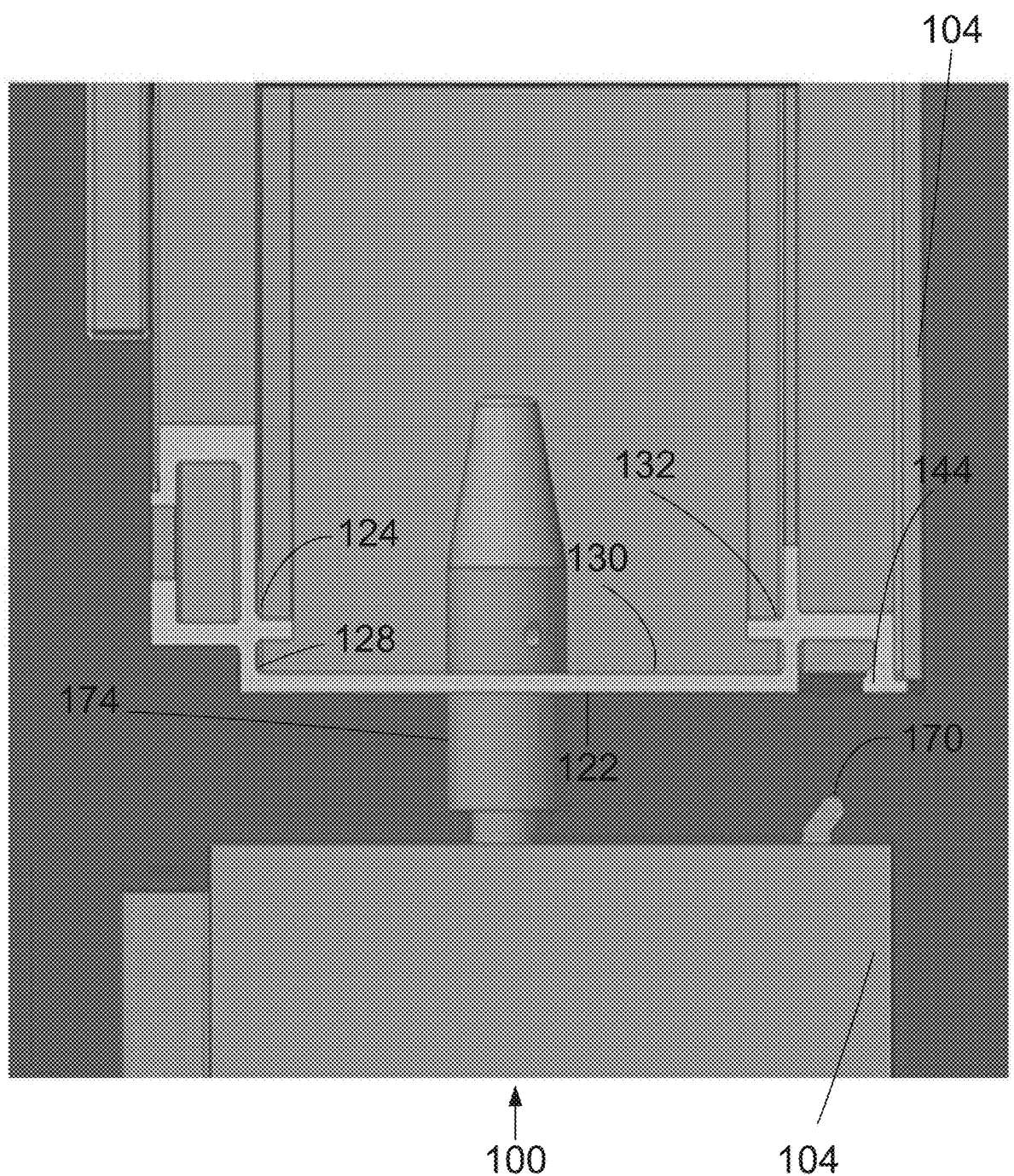
FIG. 12 shows a cross-sectional view of an embodiment comprising a pair of signage units before stacking, where the signage units are aligned via an alignment pin according to this disclosure.

FIG. 9 shows a side view of an embodiment comprising a pair of signage units before stacking, where the signage units are aligned via an alignment pin according to this disclosure. FIG. 10 shows a partial cross-sectional view and a partial side view of an embodiment comprising a pair of signage units before stacking, where the signage units are aligned via an alignment pin according to this disclosure. FIG. 11 shows a side view of an embodiment comprising a pair of signage units before stacking, where the signage units are aligned via an alignment pin according to this disclosure. FIG. 12 shows a cross-sectional view of an embodiment comprising a pair of signage units before stacking, where the signage units are aligned via an alignment pin according to this disclosure. Note that the alignment pin 174 extends through the opening of the first bridge portion 130, yet the first projection 144 and the second projection 170 are offset along a vertical plane. Likewise, note that the first wall portion 128 is not aligned with the lower cabinet 104, i.e., the first wall portion 128 is offset with the lower cabinet 104 along a vertical plane. Moreover, note that the upper cabinet 104 is raised over the lower cabinet 104, such as via a crane, with the upper cabinet 104 comprising the first unit 122 integrated or unitary therewith.

Figure 13:
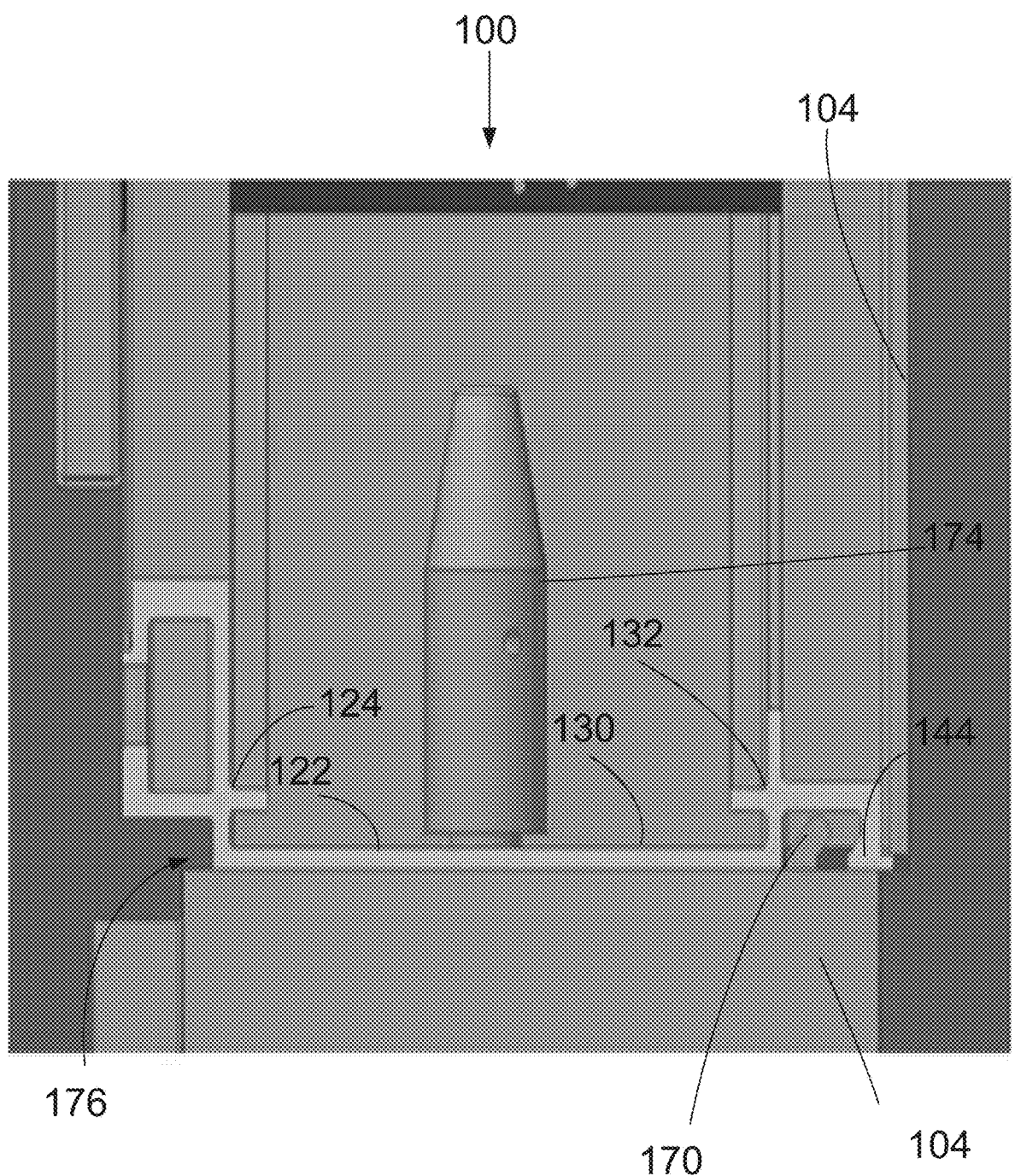
FIG. 13 shows a cross-sectional view of an embodiment comprising a pair of signage units stacked before interlocking according to this disclosure.
Figure 14:
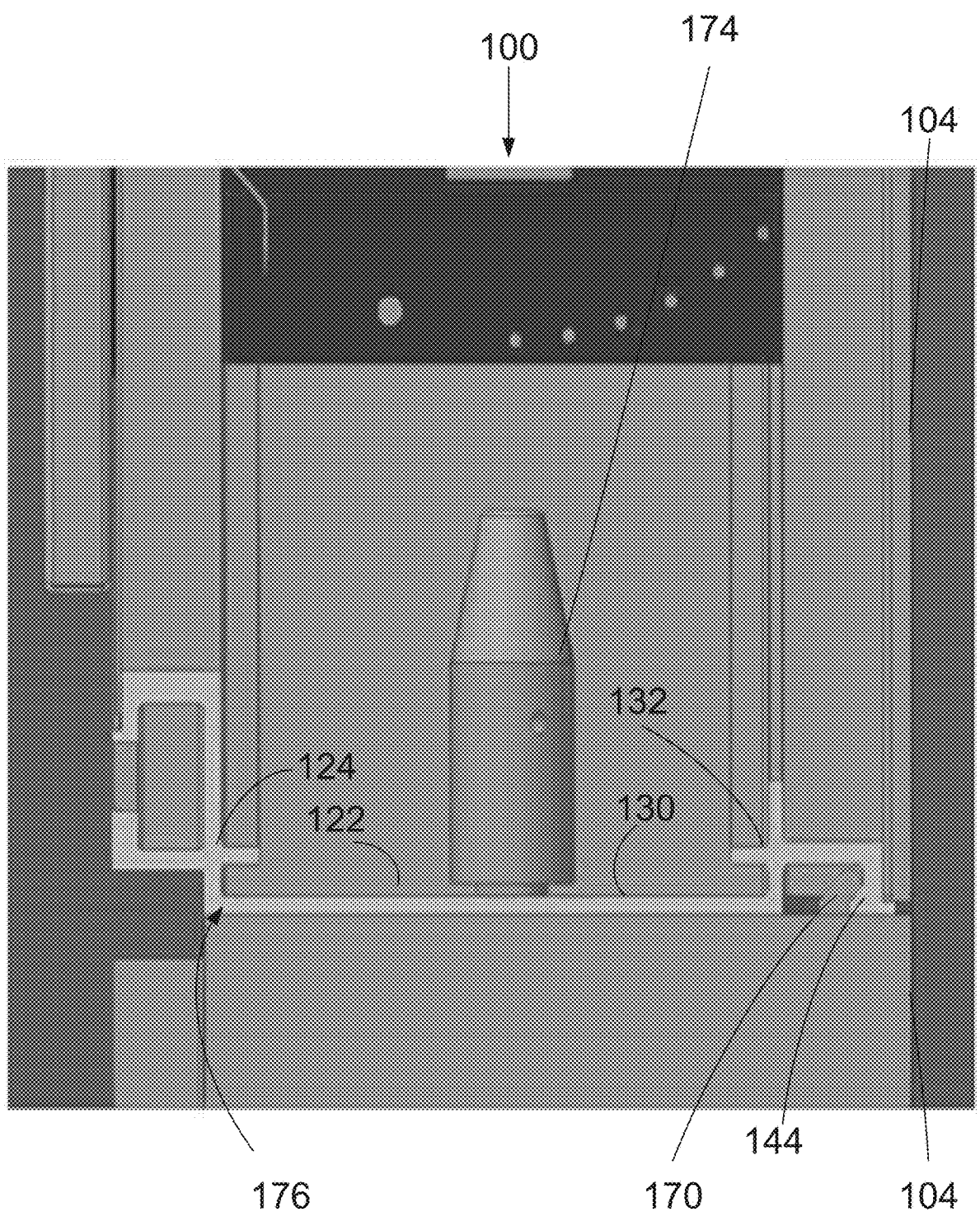
FIG. 14 shows a cross-sectional view of an embodiment comprising a pair of signage units stacked after interlocking according to this disclosure.
Figure 15:
FIG. 15 shows a cross-sectional view of an embodiment comprising a pair of signage units stacked after interlocking according to this disclosure.
Figure 16:
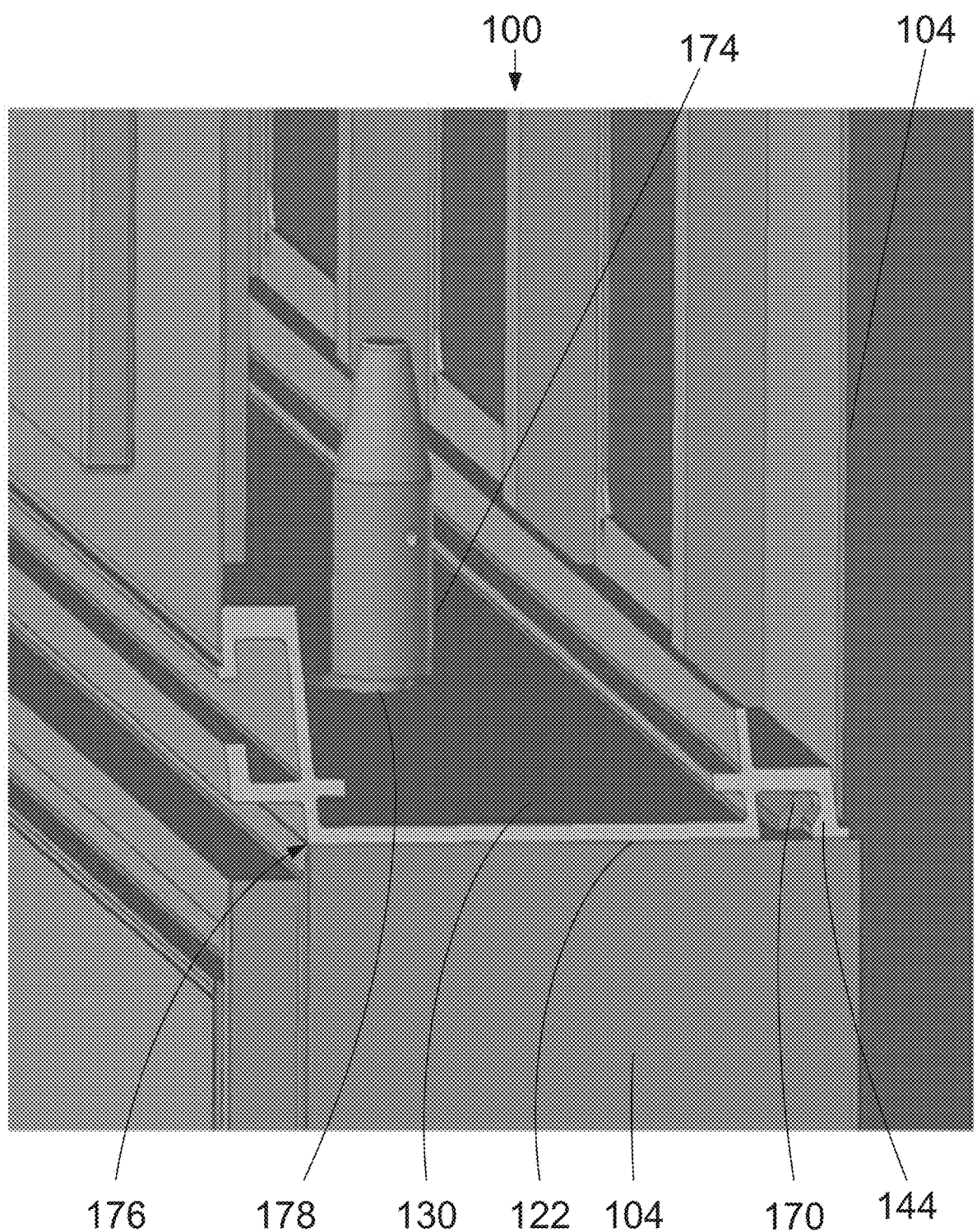
FIG. 16 shows a cross-sectional view of an embodiment comprising a pair of signage units stacked after interlocking according to this disclosure.

FIG. 13 shows a cross-sectional view of an embodiment comprising a pair of signage units stacked before interlocking according to this disclosure. FIG. 14 shows a cross-sectional view of an embodiment comprising a pair of signage units stacked after interlocking according to this disclosure. FIG. 15 shows a cross-sectional view of an embodiment comprising a pair of signage units stacked after interlocking according to this disclosure. FIG. 16 shows a cross-sectional view of an embodiment comprising a pair of signage units stacked after interlocking according to this disclosure. The first U-shaped portion 124 is moved such that the second projection 170 is positioned between the first leg portion 134 and the second leg portion 142 without contacting the first projection 144 and such that the second projection 170 extends toward the first base portion 140 and such that the second projection 170 is positioned between the first base portion 140 and the second base portion 166. Note how the tail portion 146 and the tail portion 169 are not aligned along a vertical plane. Likewise, note that since the first wall portion 128 is not aligned with the lower cabinet 104, i.e., the first wall portion 128 is offset with the lower cabinet 104 along a vertical plane, a gap 176 exists.

As the upper cabinet 104 is supported via the lower cabinet 104, while the gap 176 exists and the first projection 144 is not in contact with the second projection 170, the upper cabinet 104 or the first unit 122 or the lower cabinet 104 or the second unit 150 is operated in such a way that the first projection 144 is moved toward the second projection 170 such that the first projection 144 contacts the second projection 170 between the first leg portion 134 and the second leg portion 142 and such that the second projection 170 is positioned between the first base portion 140 and the second base portion 166. Note that such movement is enabled via the opening of the first bridge portion 130 being shaped to allow for such movement, such as laterally, for instance via the opening of the first bridge portion 130 being oval or cam shaped, while the lower part of the alignment pin 174 being sized for such movement, such as via having a diameter smaller than the middle part. Consequently, since the first projection 144 is the female portion and the second projection 170 is the female portion, the first projection 144 and the second projection 170 mate and thereby securely interlock or engage with each other. Therefore, when the nuts 118 are fastened to the bolts 116, as the bolts 116 extend through the L-shaped bracket 110 or the strut bracket 202, as disclosed herein, and as the bolts 116 engage the bolt carriers 120 within the first C-shaped portion 124 and the second C-shaped portion 152, respectively, then such fastening applies or exerts a force in a direction away from the second projection 170. This force enables a secure interlocking of the upper cabinet 104 to the lower cabinet 104, or vice versa.

Note that in some embodiments as the upper cabinet 104 is supported via the lower cabinet 104, while the gap 176 exists and the first projection 144 is not in contact with the second projection 170, the upper cabinet 104 or the first unit 122 or the lower cabinet 104 or the second unit 150 is operated in such a way that the second projection 170 is moved toward the first projection 144 such that the first projection 144 contacts the second projection 170 between the first leg portion 134 and the second leg portion 142 and such that the second projection 170 is positioned between the first base portion 140 and the second base portion 166. Further, note that although the first bridge portion 130 or the first projection 144 is laterally moved in a frictional or a slidable manner with respect to the lower cabinet 104, such as via the second unit 150, in some embodiments, the first bridge portion 130 or the first projection 144 can be moved in a non-frictional or a non-slidable manner, such as when a gap along a vertical plane exists, for instance between the lower cabinet 104 and at least one of the first bridge portion 130 or the first projection 144. For example, such gap can be less than 2 centimeters in height measured along a vertical plane. Also, after the lower cabinet 104 and the upper cabinet 104 are securely interlocked via the first unit 122 and the second unit 150, the alignment pin 174 can be removed such that the alignment pin 174 does not extend at least through the first bridge portion 130. Moreover, note that although various interlocking methods disclosed herein are described in a context of vertical stacking, in some embodiments, various interlocking methods disclosed herein can be employed in a cabinet positioning along a horizontal plane, such as adjacent to each other, or even along a diagonal plane, such as via outward corner portions.

Figure 17:
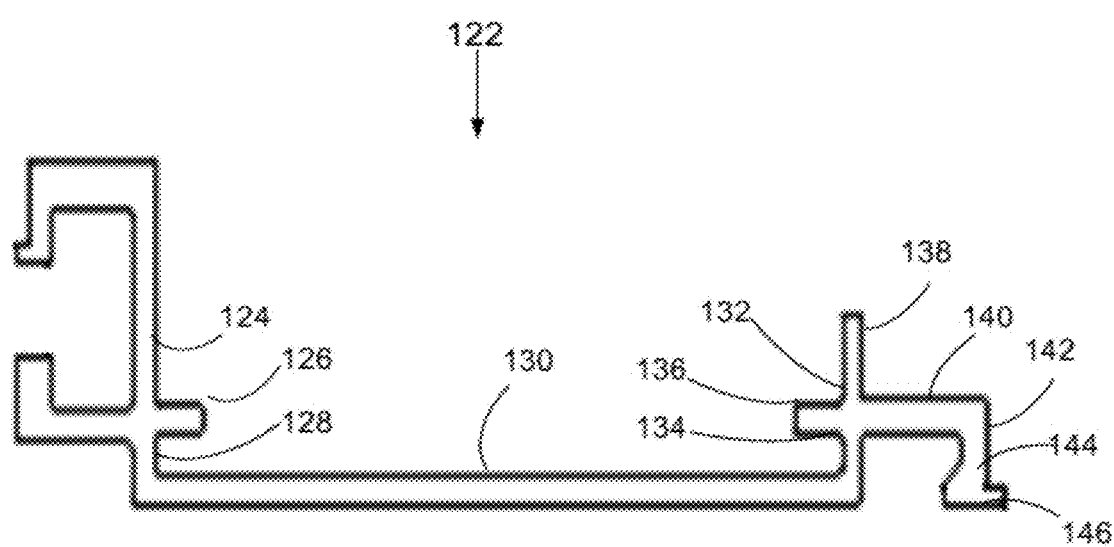
FIG. 17 shows a side view of an embodiment comprising a top interlocking unit according to this disclosure.

FIG. 17 shows a side view of an embodiment comprising a top interlocking unit according to this disclosure. The first unit 122 comprises the first C-shaped portion 124, the first bridge portion 130, and the first U-shaped portion 132. The first bridge portion 130 spans between the first C-shaped portion 124 and the first U-shaped portion 132. The first unit 122 contains the first protrusion 126. The first unit 122 contains the first wall portion 128. The first wall portion 128 stands-off the first C-shaped portion 124 from the first bridge portion 130. The first U-shaped portion 132 is defined via the first leg portion 134, the first base portion 140, and the second leg portion 142. The first leg portion 134 comprises the first projection 144 distal to the first base portion 140 and extending toward the second leg portion 142. The first leg portion 144 also includes the tail portion 146 extending therefrom. The first unit 122 contains the third protrusion 136 extending from the first U-shaped portion 132. The first unit 122 contains the fourth protrusion 138 extending from the first U-shaped portion 132.

Figure 18:
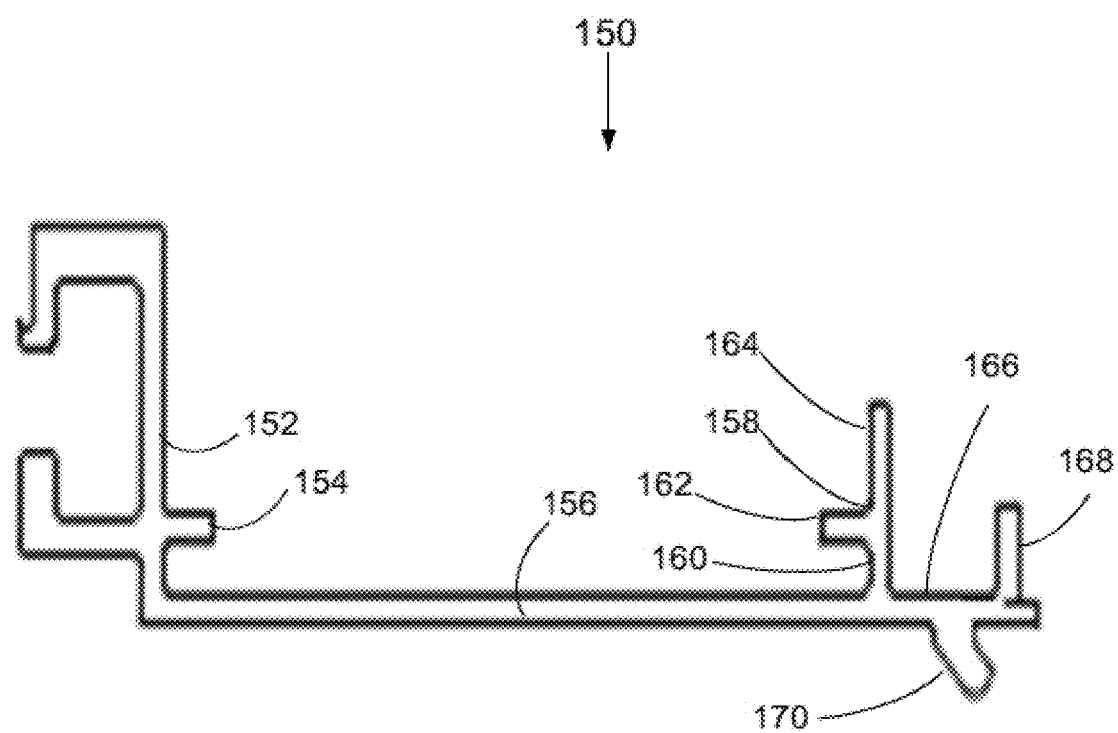
FIG. 18 shows a side view of an embodiment comprising a bottom interlocking unit according to this disclosure.

FIG. 18 shows a side view of an embodiment comprising a bottom interlocking unit according to this disclosure. The second unit 150 comprises the second C-shaped portion 152, the second bridge portion 156, and the second U-shaped portion 158. The second bridge portion 156 spans between the second C-shaped portion 152 and the second U-shaped portion 158. The second unit 150 contains the first protrusion 154. The second unit 150 contains the second wall portion 155. The second wall portion 155 stands-off the second C-shaped portion 152 from the second bridge portion 156. The second U-shaped portion 158 is defined via the third leg portion 160, the second base portion 166, and the fourth leg portion 168. The second base portion 166 comprises the second projection 170. The fourth leg portion 168 includes the tail portion 169 extending therefrom. The second unit 150 contains the fifth protrusion 162 extending from the second U-shaped portion 158. The second unit 150 contains the sixth protrusion 164 extending from the second U-shaped portion 158.

Figure 19:
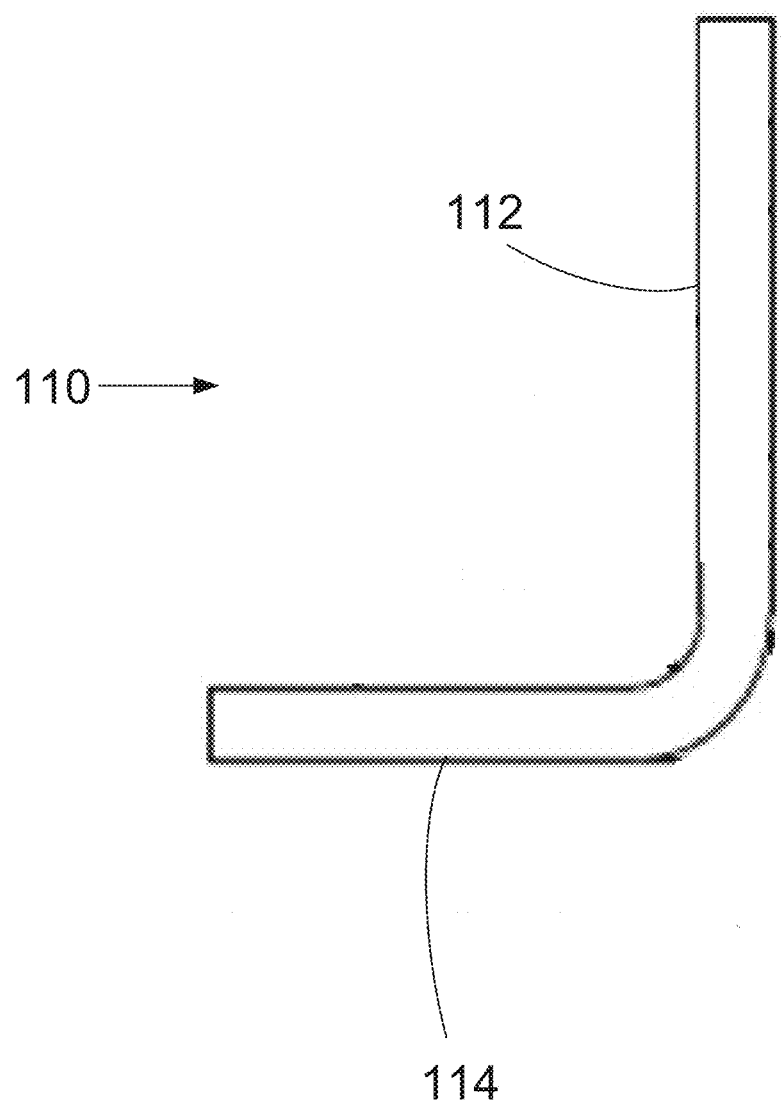
FIG. 19 shows a side view of an embodiment comprising an L-shaped bracket according to this disclosure.

FIG. 19 shows a side view of an embodiment comprising an L-shaped bracket according to this disclosure. The L-shaped bracket 110 is defined via the first plate 112 and the second plate 114. The first plate 112 is perpendicularly coupled to the second plate 114. For example, the L-shaped bracket 110 can comprise a single piece of steel that is bent into an L-shape. However, note that non-perpendicular orientation is possible, whether acute or obtuse. Also, note that the L-shaped bracket 110 can be a plurality of plates coupled together, such as the first plate 112 and the second plate 114. In some embodiments, at least one of a J-shaped, a T-shaped, an N-shaped, a P-shaped, or a V-shaped bracket is used additional or alternative to the L-shaped bracket 110.

Figure 20:
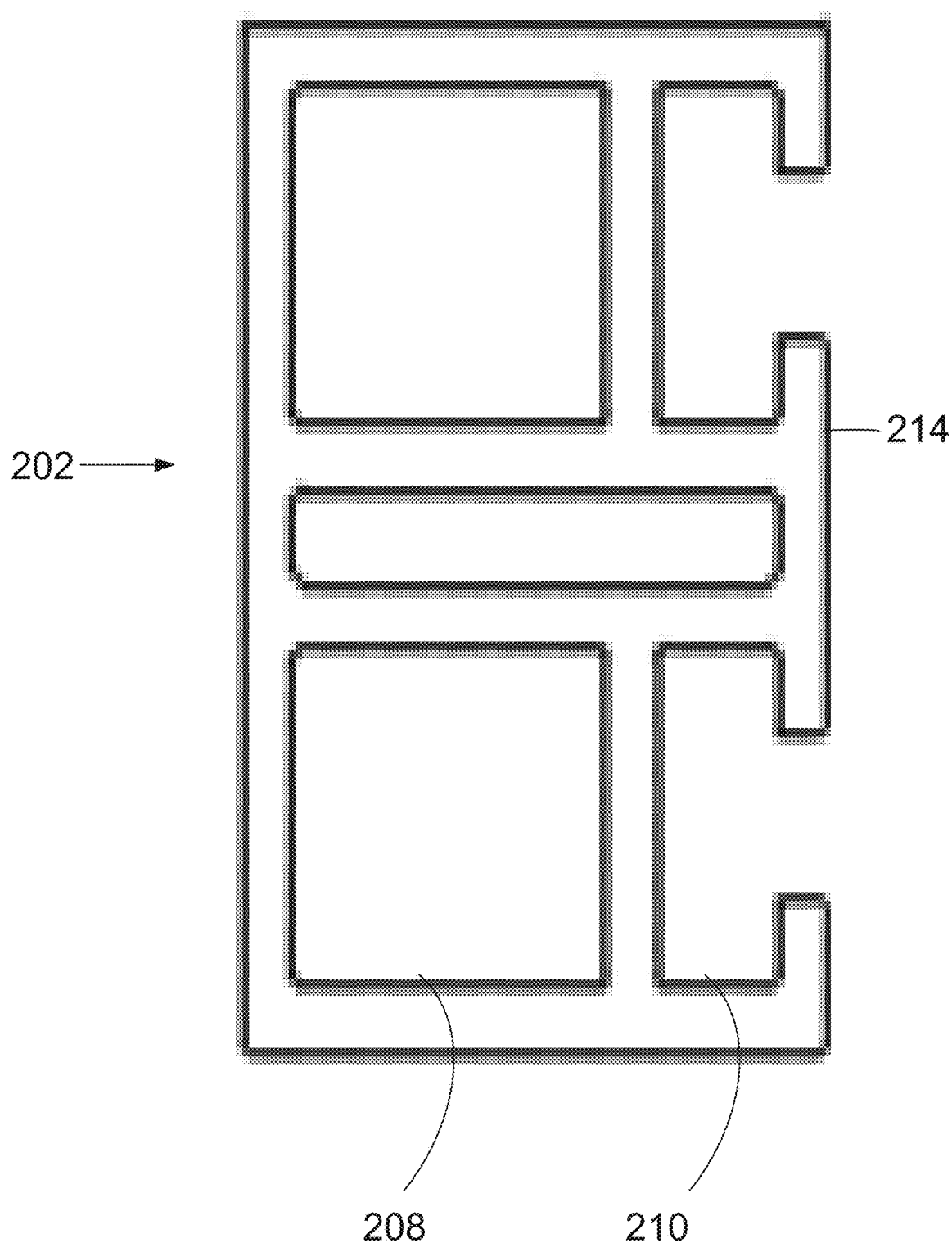
FIG. 20 shows a side view of an embodiment comprising a strut bracket according to this disclosure.

FIG. 20 shows a side view of an embodiment comprising a strut bracket according to this disclosure. The strut bracket 202, such as a beam clamp, is defined via a first portion 208, a second portion 210, and a third portion 214. The first portion 208 is O-shaped, but other shapes are possible. The second portion 210 is C-shaped, but other shapes are possible.

Although various interlocking concepts of this disclosure are described in context of signage, the interlocking concepts of this disclosure can be applied to other industries, such as photovoltaic panels, speakers, construction, vehicles, plumbing, heating-ventilation-air conditioning (HVAC), sporting equipment, or others, including any components thereof.

In some embodiments, various functions or acts can take place at a given location and/or in connection with the operation of one or more apparatuses or systems. In some embodiments, a portion of a given function or act can be performed at a first device or location, and a remainder of the function or act can be performed at one or more additional devices or locations.

The corresponding structures, materials, acts, and equivalents of all means or step plus function elements in the claims below are intended to include any structure, material, or act for performing the function in combination with other claimed elements as specifically claimed. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the steps can be performed in a differing order or steps can be added, deleted or modified. All of these variations are considered a part of the disclosure. It will be understood that those skilled in the art, both now and in the future, can make various improvements and enhancements which fall within the scope of the claims which follow.

The description of this disclosure has been presented for purposes of illustration and description, but is not intended to be fully exhaustive and/or limited to the disclosure in the form disclosed. Many modifications and variations in techniques and structures will be apparent to those of ordinary skill in an art without departing from a scope and spirit of this disclosure as set forth in the claims that follow. Accordingly, such modifications and variations are contemplated as being a part of this disclosure. A scope of this disclosure is defined by various claims, which include known equivalents and unforeseeable equivalents at a time of filing of this disclosure.

What is claimed is:

1. A device comprising:
a first signage cabinet;
a first unit comprising a first C-shaped portion, a first bridge portion, and a first U-shaped portion, wherein the first C-shaped portion is fastened to a plate, wherein the first bridge portion spans between the first C-shaped portion and the first U-shaped portion, wherein the first U-shaped portion is defined via a first leg portion, a first base portion, and a second leg portion, wherein the first leg portion comprises a first projection distal to the first base portion and extending toward the second leg portion, wherein the first unit extends within the first signage cabinet;
a second signage cabinet; and
a second unit comprising a second C-shaped portion, a second bridge portion, and a second U-shaped portion, wherein the second C-shaped portion is fastened to the plate, wherein the first bridge portion contacts the second bridge portion, wherein the second bridge portion spans between the second C-shaped portion and the second U-shaped portion, wherein the second U-shaped portion is defined via a third leg portion, a second base portion, and a fourth leg portion, wherein the second unit extends within the second signage cabinet, wherein the second base portion comprises a second projection extending toward the first base portion such that the first projection contacts the second projection between the first leg portion and the second leg portion, wherein the first unit and the second unit extend between the first signage cabinet and the second signage cabinet, wherein the first signage cabinet, the first unit, the second signage cabinet, and the second unit are separate and distinct from each other.

2. The device of claim 1, wherein the plate is included in an L-shaped bracket.

3. The device of claim 1, wherein the plate is included in a strut bracket, wherein the strut bracket includes a closed-shape section and an opened-shape section.

4. The device of claim 1, wherein the first leg portion is aligned with the third leg portion.

5. The device of claim 1, wherein the first C-shaped portion opposes the second C-shaped portion.

6. The device of claim 1, wherein the first unit is monolithic.

7. The device of claim 1, wherein the second unit is monolithic.

8. The device of claim 1, wherein the first unit is monolithic and the second unit is monolithic.

9. The device of claim 8, wherein the first unit includes metal and the second unit includes metal.

10. The device of claim 1, wherein the first signage cabinet is stacked on the second signage cabinet or the second signage cabinet is stacked on the first signage cabinet.

11. A method comprising:
accessing a first unit comprising a first C-shaped portion, a first bridge portion, and a first U-shaped portion, wherein the first bridge portion spans between the first C-shaped portion and the first U-shaped portion, wherein the first U-shaped portion is defined via a first leg portion, a first base portion, and a second leg portion, wherein the first leg portion comprises a first projection distal to the first base portion and extending toward the second leg portion, wherein the first unit extends within a first signage cabinet;
accessing a second unit comprising a second C-shaped portion, a second bridge portion, and a second U-shaped portion, wherein the second bridge portion spans between the second C-shaped portion and the second U-shaped portion, wherein the second U-shaped portion is defined via a third leg portion, a second base portion, and a fourth leg portion, wherein the second base portion comprises a second projection, wherein the second unit extends within a second signage cabinet;
moving the first U-shaped portion such that the second projection is positioned between the first leg portion and the second leg portion without contacting the first projection and such that the second projection extends toward the first base portion and such that the second projection is positioned between the first base portion and the second base portion;
moving the first projection toward the second projection such that the first projection contacts the second projection between the first leg portion and the second leg portion and such that the second projection is positioned between the first base portion and the second base portion; and
fastening the first C-shaped portion and the second C-shaped portion to a plate such that the first unit and the second unit reside between the first signage cabinet and the second signage cabinet, wherein the first signage cabinet, the first unit, the second signage cabinet, and the second unit are separate and distinct from each other.

12. The method of claim 11, wherein the plate is included in an L-shaped bracket.

13. The method of claim 11, wherein the plate is included in a strut bracket, wherein the strut bracket includes a closed-shape section and an opened-shape section.

14. The method of claim 11, wherein the first leg portion is aligned with the third leg portion.

15. The method of claim 11, wherein the first C-shaped portion opposes the second C-shaped portion.

16. The method of claim 11, wherein the first unit is monolithic.

17. The method of claim 11, wherein the second unit is monolithic.

18. The method of claim 11, wherein the first unit is monolithic and the second unit is monolithic.

19. The method of claim 18, wherein the first unit includes metal and the second unit includes metal.

20. The method of claim 11, wherein the first signage cabinet is stacked on the second signage cabinet or the second signage cabinet is stacked on the first signage cabinet.

* * * * *